(12) United States Patent  
Gandhi et al.

(10) Patent No.: US 9,223,128 B2  
(45) Date of Patent: Dec. 29, 2015

(54) DISPLAY APPARATUS WITH DENSELY PACKED ELECTROMECHANICAL SYSTEMS DISPLAY ELEMENTS

(71) Applicant: Pixtronix, Inc., San Diego, CA (US)

(72) Inventors: Jignesh Gandhi, Burlington, MA (US); Stephen R. Lewis, Reading, MA (US); Timothy J. Brosnihan, Natick, MA (US)

(73) Assignee: Pixtronix, Inc., San Diego, CA (US)

( * ) Notice: Subject to any disclaimer, the term of this patent is extended or adjusted under 35 U.S.C. 154(b) by 500 days.

(21) Appl. No.: 13/718,833

(22) Filed: Dec. 18, 2012

(65) Prior Publication Data

US 2014/0168235 A1 Jun. 19, 2014

(51) Int. Cl.
*G06F 13/14* (2006.01)
*G02B 26/02* (2006.01)
*G09G 3/34* (2006.01)

(52) U.S. Cl.
CPC ............. *G02B 26/02* (2013.01); *G09G 3/3433* (2013.01); *G09G 2300/0426* (2013.01)

(58) Field of Classification Search
CPC .................. G02B 6/353; G02B 6/0068; B81B 2201/045; B81B 2201/047; B81B 2207/015; B81B 7/008; G09G 2300/0426; G09G 2330/021; G09G 2330/028; G09G 3/2003; G09G 3/3648; G06T 11/001; G06F 3/042; G06F 3/03547; G06F 3/0412; G02F 1/13338; H01H 2001/0052
See application file for complete search history.

(56) References Cited

U.S. PATENT DOCUMENTS

| | | |
|---|---|---|
| 6,713,786 B2 | 3/2004 | Colgan et al. |
| 6,816,296 B2 | 11/2004 | Romanovsky |
| 2004/0171206 A1 | 9/2004 | Rodgers |
| 2005/0151457 A1* | 7/2005 | Schrijvers ........... H01L 51/5237 313/461 |
| 2006/0187528 A1 | 8/2006 | Hagood et al. |
| 2007/0206269 A1 | 9/2007 | Martin |
| 2008/0137177 A1* | 6/2008 | Jung ..................... G06F 3/0416 359/296 |
| 2008/0158635 A1 | 7/2008 | Hagood et al. |
| 2011/0122474 A1 | 5/2011 | Payne et al. |
| 2011/0267668 A1 | 11/2011 | Hagood, IV et al. |
| 2012/0162232 A1 | 6/2012 | He et al. |

FOREIGN PATENT DOCUMENTS

| | | |
|---|---|---|
| WO | 2006091860 A2 | 8/2006 |
| WO | 2012087942 A2 | 6/2012 |

OTHER PUBLICATIONS

Partial International Search Report—PCT/US2013/074634—ISA/EPO—Mar. 4, 2014.
International Search Report and Written Opinion—PCT/US2013/074634—ISA/EPO—May 9, 2014.
Taiwan Search Report—TW102145977—TIPO—Sep. 26, 2014.

* cited by examiner

*Primary Examiner* — Abbas Abdulselam
*Assistant Examiner* — Gerald Oliver
(74) *Attorney, Agent, or Firm* — Edward A. Gordon; Foley & Lardner LLP

(57) ABSTRACT

This disclosure provides systems, methods and apparatus for reducing undesired capacitance and electrostatic attraction among components of electromechanical systems (EMS) displays. An apparatus includes an array of display elements, a control matrix, and an electric insulation layer. The display elements each include a movable light blocking component coupled to a conductive beam. The control matrix includes a plurality of interconnects, including at least one switched interconnect, which passes under and is electrically isolated from at least one of the conductive beam and the movable light blocking component.

23 Claims, 15 Drawing Sheets

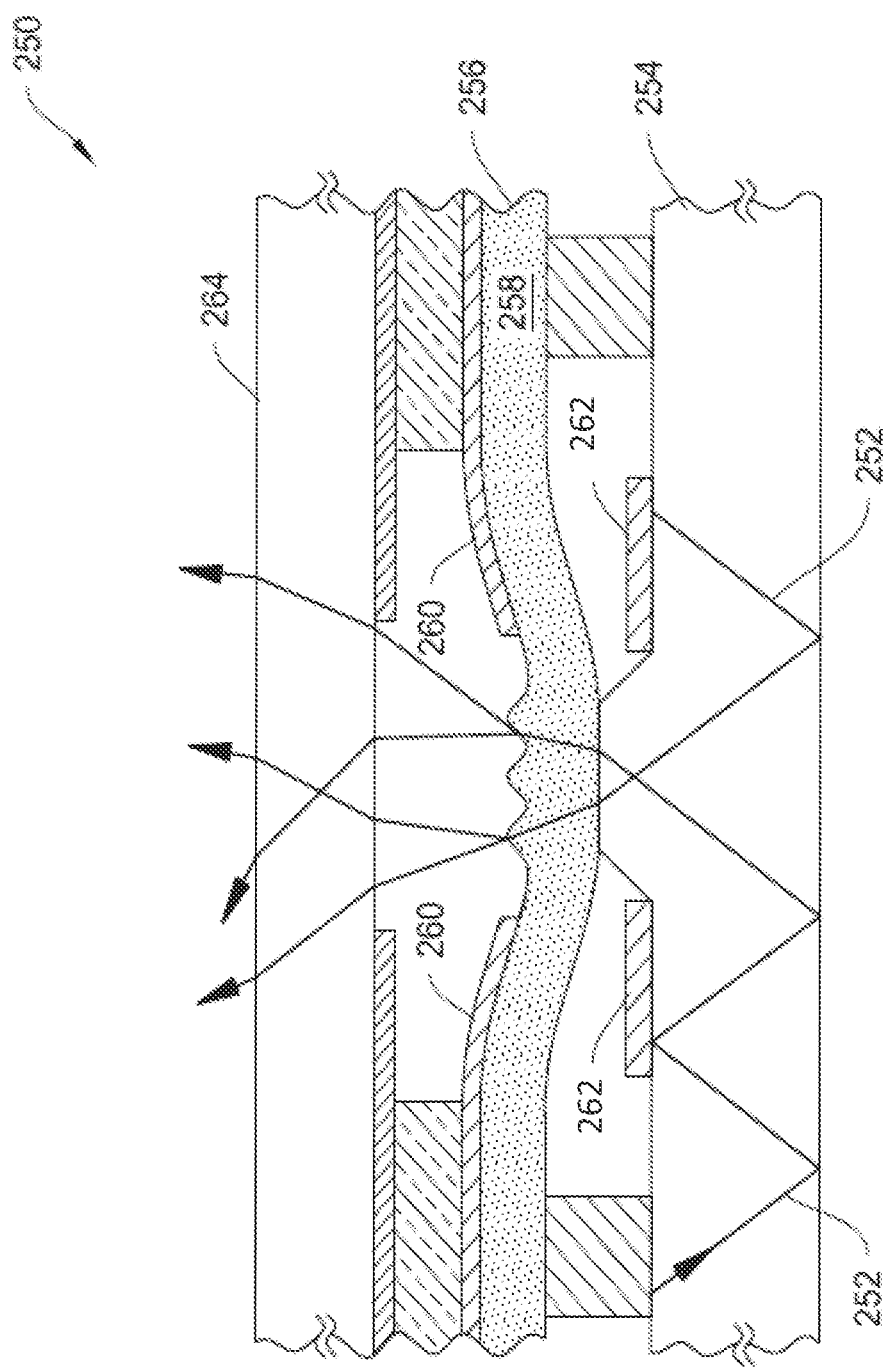

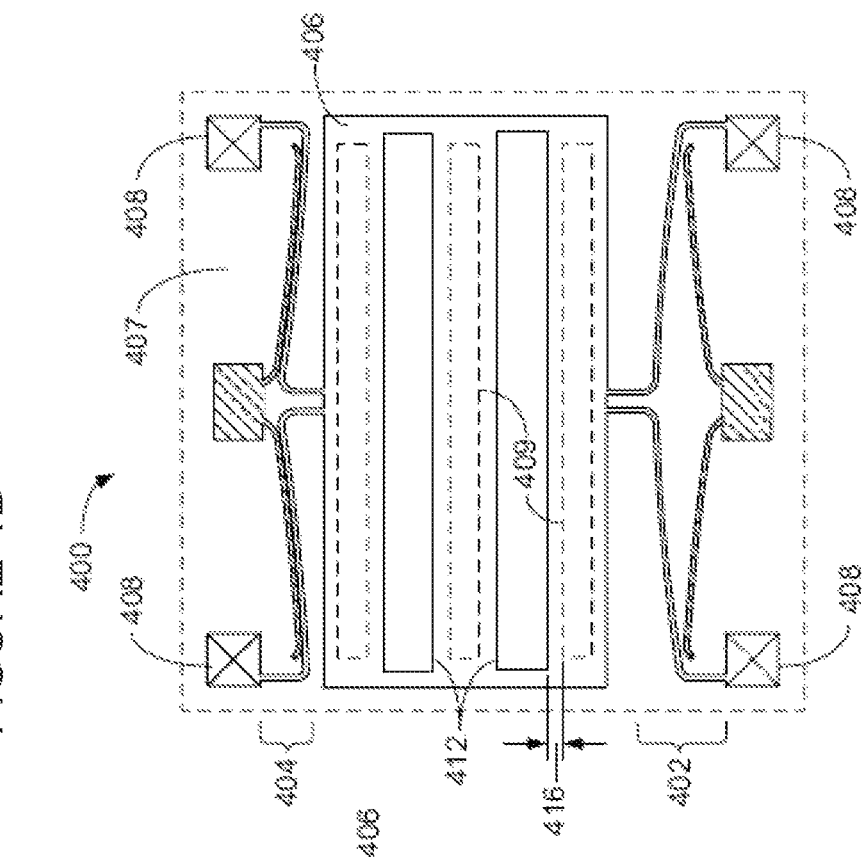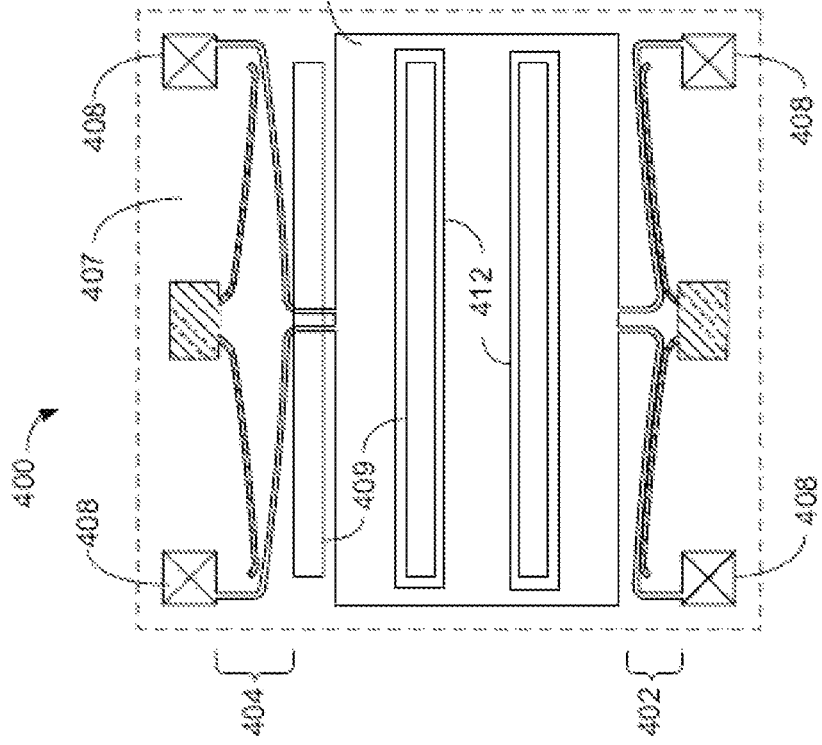

DISPLAY APPARATUS WITH DENSELY PACKED ELECTROMECHANICAL SYSTEMS DISPLAY ELEMENTS

TECHNICAL FIELD

This disclosure relates to the field of displays, and in particular, to displays that include switched interconnects routed underneath suspended components of electromechanical systems (EMS) display elements.

DESCRIPTION OF THE RELATED TECHNOLOGY

Electromechanical systems (EMS) devices, and larger scale devices, have been incorporated into a variety of display devices to modulate light. Some EMS light modulators include components that are suspended over the substrate on which they are fabricated and are configured to move in a plane substantially parallel to the substrate.

Generally, displays with such architectures have forgone routing electrical interconnects underneath these suspended components to limit the risk that the electrical fields generated from current passing through the interconnects would result in electrostatic attraction between the suspended components and the interconnects. Such attraction could potentially draw the components into contact with the substrate or other intervening display components, where they might permanently adhere as a result of static friction or stiction. Routing the interconnects beneath the suspended components also increases the opportunity for parasitic capacitance on the interconnects. This increased capacitance results in additional power being needed to operate the display, and slows down its addressing and/or actuation time.

To avoid these potential problems, such displays have routed their interconnects between display elements, such that they do not pass under any suspended display element components. While doing so mitigates the risk of stiction and reduces capacitance on the interconnects, placing the interconnects between display elements takes up significant substrate real-estate, limiting the packing density and/or the aperture ratio of the display elements.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus that includes an array of display elements, a control matrix, and an electrical insulation layer. Each of the display elements has suspended components, including a movable light blocking component and a conductive beam coupled to the movable light blocking component. The control matrix includes a plurality of interconnects. The interconnects include at least one switched interconnect which couples to portions of a plurality of the display elements in the array, passes under at least one of the conductive beam and the movable light blocking components, and which is electrically isolated from the movable light blocking components. The electrical insulation layer has a thickness greater than about 1 micron and less than about 5 microns, and is disposed between the at least one switched interconnect and the suspended components of the display elements.

In some implementations, the electrical insulation layer can be disposed between an uppermost interconnect of the control matrix and the suspended components of the display apparatus. In some implementations, the conductive beam of each of the display elements is coupled to an anchor, and the electric insulation layer is disposed under the anchors supporting the conductive beams of the display elements.

In some implementations, the electric insulation layer has a thickness of greater than about 1.5 microns and less than about 4 microns. In some other implementations, the electrical insulation layer has a thickness of greater than about 2 microns and less than about 4 microns. In some implementations, the electric insulation layer is light absorbing. In some other implementations, the electric insulation layer is substantially transparent.

In some implementations, the apparatus includes a light blocking layer positioned between the light-blocking components and a backlight. In some such implementations, the switched interconnect can be disposed over the light blocking layer. In some implementations, the light blocking layer includes a plurality of openings, and the light blocking component of each display element is configured to move into and out of alignment with a corresponding opening in the light blocking layer. In some implementations, the electric insulation layer extends over the plurality of openings.

In some implementations, the switched interconnect is either a data interconnect, a write-enabling interconnect, or an actuation voltage interconnect. In some implementations, the switched interconnect includes an interconnect coupled to display elements in multiple rows and multiple columns of the array of display elements.

In some implementations, the apparatus of includes a display, a processor that is configured to communicate with the display, the processor being configured to process image data, and a memory device that is configured to communicate with the processor. In some implementations, the display also includes a driver circuit configured to send at least one signal to the display and a controller configured to send at least a portion of the image data to the driver circuit. In some other implementations, the apparatus the display also includes an image source module configured to send the image data to the processor. The image source module may include at least one of a receiver, transceiver, and transmitter. The display may also include an input device configured to receive input data and to communicate the input data to the processor.

Another innovative aspect of the subject matter described in this disclosure can be implemented in a display device. The display device includes an array of display elements, a control matrix, and a means for reducing the strength of an electric field. The array of display elements includes light modulating means. The control matrix includes a plurality of interconnects, including at least one switched interconnect which couples to portions of a plurality of the display elements in the array, passes under at least a portion of the light modulating means, and which is electrically isolated from the light modulating means. The means for reducing the strength of an electric field is configured to reduce the strength of the electric field emanating from the switched interconnect on the light modulating means.

In some implementations, the light modulating means includes a light blocking shutter suspended over a substrate by a compliant beam. The means for reducing the strength of the electric field may include an electric insulation layer disposed between the switched interconnect and the light modulating means. The thickness of the electric insulation layer may be greater than about 1 micron and less than about a 5 microns.

In some implementations, the display device may also include a means for reducing the capacitance of the interconnects in the control matrix. The means for reducing capacitance may be the same as, or include the means for reducing the strength of the electric field.

Details of one or more implementations of the subject matter described in this specification are set forth in the accompanying drawings and the description below. Although the examples provided in this summary are primarily described in terms of MEMS-based displays, the concepts provided herein may apply to other types of displays, such as liquid crystal displays (LCDs), organic light emitting diode (OLED) displays, electrophoretic displays, and field emission displays, as well as to other non-display MEMS devices, such as MEMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

FIG. 2B shows an example cross sectional view of an illustrative non shutter-based MEMS light modulator.

FIGS. 4A and 4B show example views of a dual actuator shutter assembly.

Like reference numbers and designations in the various drawings indicate like elements.

DETAILED DESCRIPTION

Figure 1A:
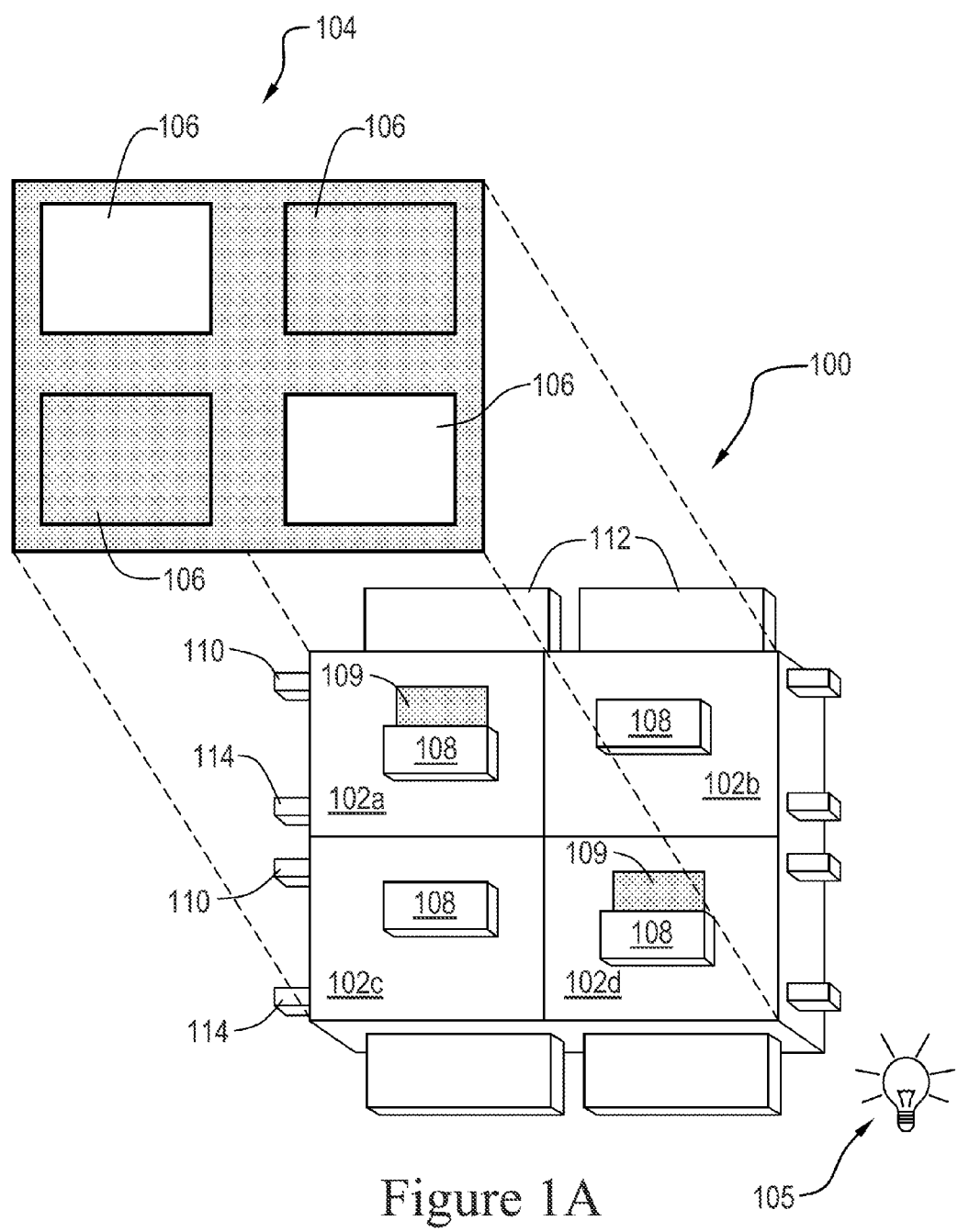
FIG. 1A shows an example schematic diagram of a direct-view microelectromechanical systems (MEMS) based display apparatus.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Electromechanical systems (EMS) display apparatus and processes for manufacturing such display apparatus are disclosed herein. EMS display apparatus include display apparatus that incorporate nanoelectromechancial systems (NEMS), microelectromechanical systems (MEMS), or larger scale EMS display elements. More particularly, the display apparatus disclosed herein incorporate switched interconnects that are routed underneath suspended components of an array of EMS display elements, such as light modulating shutters and compliant beams that form electrostatic actuators configured to move the shutter between states. In various implementations, the switched interconnects may include write-enabling interconnects, also referred to as scan-line interconnects, data interconnects, actuation voltage interconnects or global actuation interconnects.

To mitigate the impact of the electric fields emanating from the interconnects, in some implementations a relatively thick layer of electrically insulating material, such as a dielectric, is deposited over the uppermost interconnect in the display apparatus. The layer of dielectric material ranges from greater than about 1 micron to less than about 5 microns. This is in contrast to the thickness of a typical inter-metal dielectric layer which ranges from about 0.1 microns to about 1 microns.

In some other implementations, the display apparatus omits the thicker layer of electrically insulating material. In such implementations, the display apparatus includes taller anchors, which support the suspended components of the display apparatus a greater distance over the uppermost interconnect.

Particular implementations of the subject matter described in this disclosure can be implemented to realize one or more of the following potential advantages. In some implementations, routing display interconnects underneath suspended components of EMS display elements incorporated therein allows for a tighter packing of display elements. This, in turn, allows for higher display resolution. Alternatively, such routing can allow for increased display aperture ratio.

Spacing the suspended components from the interconnects by a relatively thick layer of electrically insulating material reduces the strength of the electric field emanating from the interconnects. This reduces the risk of undesirable electrostatic attraction pulling the suspended components out of their intended plane of travel, which would increase the risk of stiction between the suspended components and other display components.

Incorporation of the layer of electrically insulating material also advantageously reduces the volume of fluid used to fill the display apparatus. The risk of bubble formation in the fluid resulting from ambient temperature changes increases with the volume of the fluid used to fill the device. Thus, filling space in the display apparatus with the layer of electrically insulating material instead of additional fluid reduces the likelihood of bubble formation.

Spacing the suspended components further away from the interconnects also decreases the capacitance between them. Such capacitance can substantially slow the propagation rate of signals along the interconnects, as well as require additional power to operate effectively. Thus, decreasing this capacitance increases the speed with which the display can be addressed and/or actuated, and also reduces the power consumed by the display.

FIG. 1A shows a schematic diagram of a direct-view MEMS-based display apparatus 100. The display apparatus 100 includes a plurality of light modulators 102a-102d (generally "light modulators 102") arranged in rows and columns. In the display apparatus 100, the light modulators 102a and 102d are in the open state, allowing light to pass. The light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide luminance level in an image 104. With respect to an image, a "pixel" corresponds to the smallest picture element defined by the resolution of image. With respect to structural components of the display apparatus 100, the term "pixel" refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the user sees the image by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or "backlight" so that each pixel can be uniformly illuminated. Transmissive direct-view displays are often built onto transparent or glass substrates to facilitate a sandwich assembly arrangement where one substrate, containing the light modulators, is positioned directly on top of the backlight.

Each light modulator 102 can include a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix connected to the substrate and to the light modulators for controlling the movement of the shutters. The control matrix includes a series of electrical interconnects (such as interconnects 110, 112 and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{WE}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, for example, transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
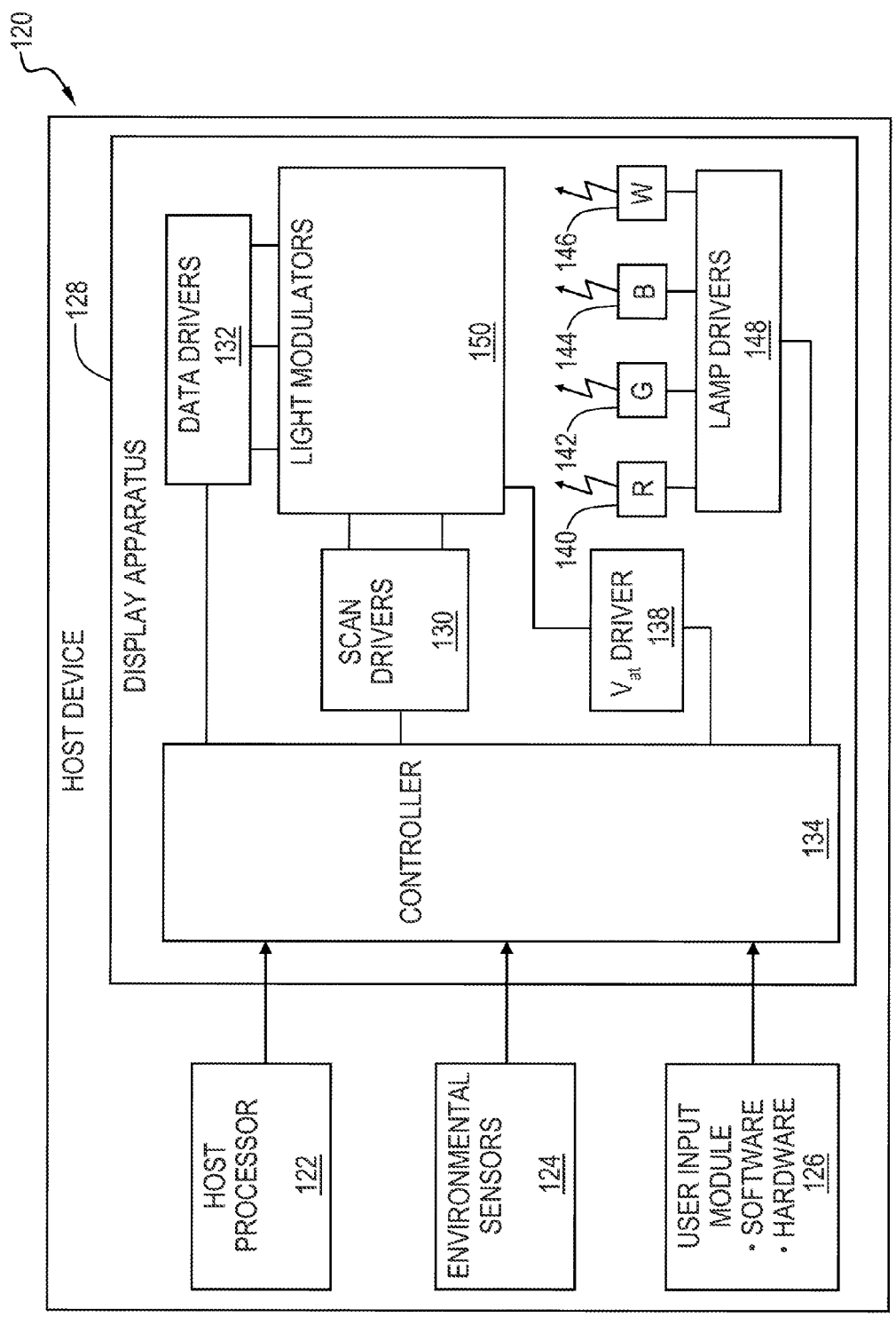
FIG. 1B shows an example block diagram of a host device.

FIG. 1B shows an example of a block diagram of a host device 120 (i.e., cell phone, smart phone, PDA, MP3 player, tablet, e-reader, netbook, notebook, etc.). The host device 120 includes a display apparatus 128, a host processor 122, environmental sensors 124, a user input module 126, and a power source.

The display apparatus 128 includes a plurality of scan drivers 130 (also referred to as "write enabling voltage sources"), a plurality of data drivers 132 (also referred to as "data voltage sources"), a controller 134, common drivers 138, lamps 140-146, lamp drivers 148 and an array 150 of display elements, such as the light modulators 102 shown in FIG. 1A. The scan drivers 130 apply write enabling voltages to scan-line interconnects 110. The data drivers 132 apply data voltages to the data interconnects 112.

In some implementations of the display apparatus, the data drivers 132 are configured to provide analog data voltages to the array 150 of display elements, especially where the luminance level of the image 104 is to be derived in analog fashion. In analog operation, the light modulators 102 are designed such that when a range of intermediate voltages is applied through the data interconnects 112, there results a range of intermediate open states in the shutters 108 and therefore a range of intermediate illumination states or luminance levels in the image 104. In other cases, the data drivers 132 are configured to apply only a reduced set of 2, 3 or 4 digital voltage levels to the data interconnects 112. These voltage levels are designed to set, in digital fashion, an open state, a closed state, or other discrete state to each of the shutters 108.

The scan drivers 130 and the data drivers 132 are connected to a digital controller circuit 134 (also referred to as the "controller 134"). The controller sends data to the data drivers 132 in a mostly serial fashion, organized in predetermined sequences grouped by rows and by image frames. The data drivers 132 can include series to parallel data converters, level shifting, and for some applications digital to analog voltage converters.

The display apparatus optionally includes a set of common drivers 138, also referred to as common voltage sources. In some implementations, the common drivers 138 provide a DC common potential to all display elements within the array 150 of display elements, for instance by supplying voltage to a series of common interconnects 114. In some other implementations, the common drivers 138, following commands from the controller 134, issue voltage pulses or signals to the array 150 of display elements, for instance global actuation pulses which are capable of driving and/or initiating simultaneous actuation of all display elements in multiple rows and columns of the array 150.

All of the drivers (such as scan drivers 130, data drivers 132 and common drivers 138) for different display functions are time-synchronized by the controller 134. Timing commands from the controller coordinate the illumination of red, green and blue and white lamps (140, 142, 144 and 146 respectively) via lamp drivers 148, the write-enabling and sequencing of specific rows within the array 150 of display elements, the output of voltages from the data drivers 132, and the output of voltages that provide for display element actuation. In some implementations, the lamps are light emitting diodes (LEDs).

The controller 134 determines the sequencing or addressing scheme by which each of the shutters 108 can be re-set to the illumination levels appropriate to a new image 104. New images 104 can be set at periodic intervals. For instance, for video displays, the color images 104 or frames of video are refreshed at frequencies ranging from 10 to 300 Hertz (Hz). In some implementations the setting of an image frame to the array 150 is synchronized with the illumination of the lamps 140, 142, 144 and 146 such that alternate image frames are illuminated with an alternating series of colors, such as red, green, and blue. The image frames for each respective color is referred to as a color subframe. In this method, referred to as the field sequential color method, if the color subframes are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, and blue.

In some implementations, where the display apparatus 100 is designed for the digital switching of shutters 108 between open and closed states, the controller 134 forms an image by the method of time division gray scale, as previously described. In some other implementations, the display apparatus 100 can provide gray scale through the use of multiple shutters 108 per pixel.

In some implementations, the data for an image state 104 is loaded by the controller 134 to the display element array 150 by a sequential addressing of individual rows, also referred to as scan lines. For each row or scan line in the sequence, the scan driver 130 applies a write-enable voltage to the write enable interconnect 110 for that row of the array 150, and subsequently the data driver 132 supplies data voltages, corresponding to desired shutter states, for each column in the selected row. This process repeats until data has been loaded for all rows in the array 150. In some implementations, the sequence of selected rows for data loading is linear, proceeding from top to bottom in the array 150. In some other implementations, the sequence of selected rows is pseudo-randomized, in order to minimize visual artifacts. And in some other implementations the sequencing is organized by blocks, where, for a block, the data for only a certain fraction of the image state 104 is loaded to the array 150, for instance by addressing only every $5^{th}$ row of the array 150 in sequence.

In some implementations, the process for loading image data to the array 150 is separated in time from the process of actuating the display elements in the array 150. In these implementations, the display element array 150 may include data memory elements for each display element in the array 150 and the control matrix may include a global actuation interconnect for carrying trigger signals, from common driver 138, to initiate simultaneous actuation of shutters 108 according to data stored in the memory elements.

In alternative implementations, the array 150 of display elements and the control matrix that controls the display elements may be arranged in configurations other than rectangular rows and columns. For example, the display elements can be arranged in hexagonal arrays or curvilinear rows and columns. In general, as used herein, the term scan-line shall refer to any plurality of display elements that share a write-enabling interconnect.

The host processor 122 generally controls the operations of the host. For example, the host processor 122 may be a general or special purpose processor for controlling a portable electronic device. With respect to the display apparatus 128, included within the host device 120, the host processor 122 outputs image data as well as additional data about the host. Such information may include data from environmental sensors, such as ambient light or temperature; information about the host, including, for example, an operating mode of the host or the amount of power remaining in the host's power source; information about the content of the image data; information about the type of image data; and/or instructions for display apparatus for use in selecting an imaging mode.

The user input module 126 conveys the personal preferences of the user to the controller 134, either directly, or via the host processor 122. In some implementations, the user input module 126 is controlled by software in which the user programs personal preferences such as "deeper color," "better contrast," "lower power," "increased brightness," "sports," "live action," or "animation." In some other implementations, these preferences are input to the host using hardware, such as a switch or dial. The plurality of data inputs to the controller 134 direct the controller to provide data to the various drivers 130, 132, 138 and 148 which correspond to optimal imaging characteristics.

An environmental sensor module 124 also can be included as part of the host device 120. The environmental sensor module 124 receives data about the ambient environment, such as temperature and or ambient lighting conditions. The sensor module 124 can be programmed to distinguish whether the device is operating in an indoor or office environment versus an outdoor environment in bright daylight versus an outdoor environment at nighttime. The sensor module 124 communicates this information to the display controller 134, so that the controller 134 can optimize the viewing conditions in response to the ambient environment.

Figure 2A:
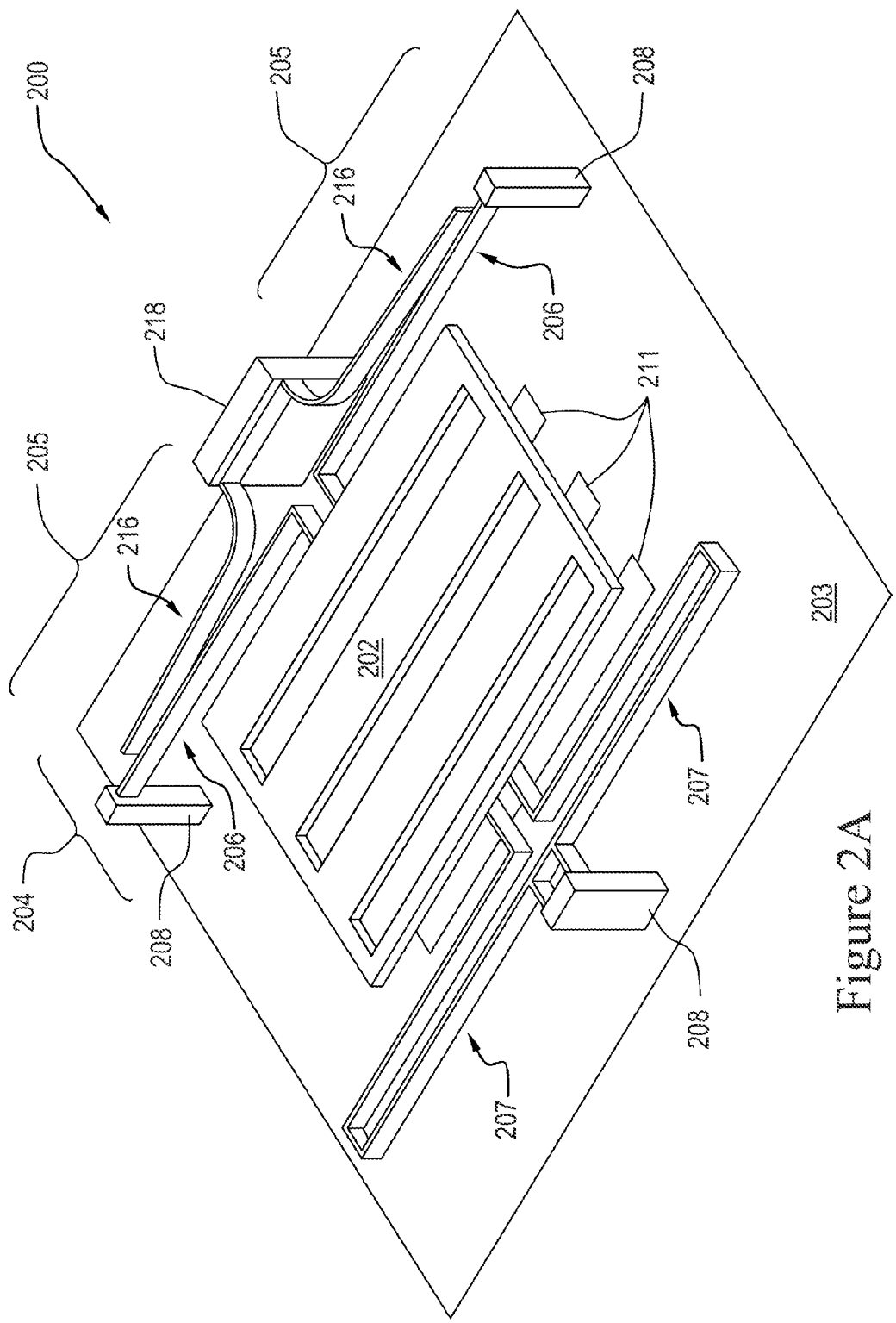
FIG. 2A shows a perspective view of an example shutter-based light modulator.

FIG. 2A shows a perspective view of an example shutter-based light modulator 200. The shutter-based light modulator 200 is suitable for incorporation into the direct-view MEMS-based display apparatus 100 of FIG. 1A. The light modulator 200 includes a shutter 202 coupled to an actuator 204. The actuator 204 can be formed from two separate compliant electrode beam actuators 205 (the "actuators 205"). The shutter 202 couples on one side to the actuators 205. The actuators 205 move the shutter 202 transversely over a surface 203 in a plane of motion which is substantially parallel to the surface 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface 203. The surface 203 includes one or more aperture holes 211 for admitting the passage of light. The load anchors 208 physically connect the compliant load beams 206 and the shutter 202 to the surface 203 and electrically connect the load beams 206 to a bias voltage, in some instances, ground.

If the substrate is opaque, such as silicon, then aperture holes 211 are formed in the substrate by etching an array of holes through the substrate 204. If the substrate 204 is transparent, such as glass or plastic, then the aperture holes 211 are formed in a layer of light-blocking material deposited on the substrate 203. The aperture holes 211 can be generally circular, elliptical, polygonal, serpentine, or irregular in shape.

Each actuator 205 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely toward the drive anchor 218. The compliant members 206 act as springs, such that when the voltage across the beams 206 and 216 potential is removed, the load beams 206 push the shutter 202 back into its initial position, releasing the stress stored in the load beams 206.

A light modulator, such as the light modulator 200, incorporates a passive restoring force, such as a spring, for returning a shutter to its rest position after voltages have been removed. Other shutter assemblies can incorporate a dual set of "open" and "closed" actuators and a separate set of "open" and "closed" electrodes for moving the shutter into either an open or a closed state.

There are a variety of methods by which an array of shutters and apertures can be controlled via a control matrix to produce images, in many cases moving images, with appropriate luminance levels. In some cases, control is accomplished by means of a passive matrix array of row and column interconnects connected to driver circuits on the periphery of the display. In other cases it is appropriate to include switching and/or data storage elements within each pixel of the array (the so-called active matrix) to improve the speed, the luminance level and/or the power dissipation performance of the display.

The display apparatus 100, in alternative implementations, includes display elements other than transverse shutter-based light modulators, such as the shutter assembly 200 described above.

FIG. 2B shows an example cross sectional view of an illustrative non shutter-based MEMS light modulator 250. The light tap modulator 250 is suitable for incorporation into an alternative implementation of the MEMS-based display apparatus 100 of FIG. 1A. A light tap works according to a principle of frustrated total internal reflection (TIR). That is, light 252 is introduced into a light guide 254, in which, without interference, light 252 is, for the most part, unable to escape the light guide 254 through its front or rear surfaces due to TIR. The light tap 250 includes a tap element 256 that has a sufficiently high index of refraction that, in response to the tap element 256 contacting the light guide 254, the light 252 impinging on the surface of the light guide 254 adjacent the tap element 256 escapes the light guide 254 through the tap element 256 towards a viewer, thereby contributing to the formation of an image.

In some implementations, the tap element 256 is formed as part of a beam 258 of flexible, transparent material. Electrodes 260 coat portions of one side of the beam 258. Opposing electrodes 262 are disposed on the light guide 254. By applying a voltage across the electrodes 260 and 262, the position of the tap element 256 relative to the light guide 254 can be controlled to selectively extract light 252 from the light guide 254.

Figure 3A:
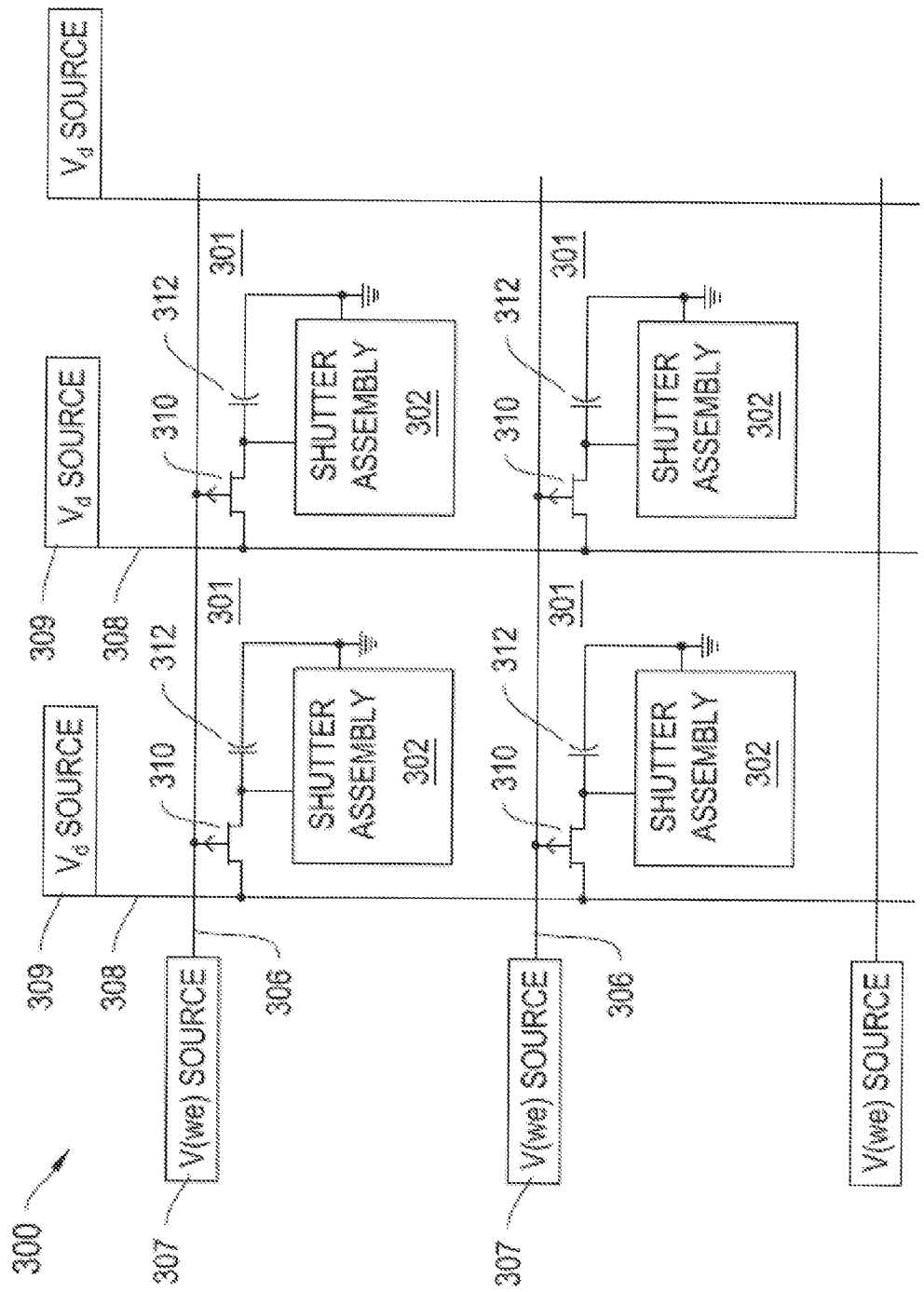
FIG. 3A shows an example schematic diagram of a control matrix.
Figure 3B:
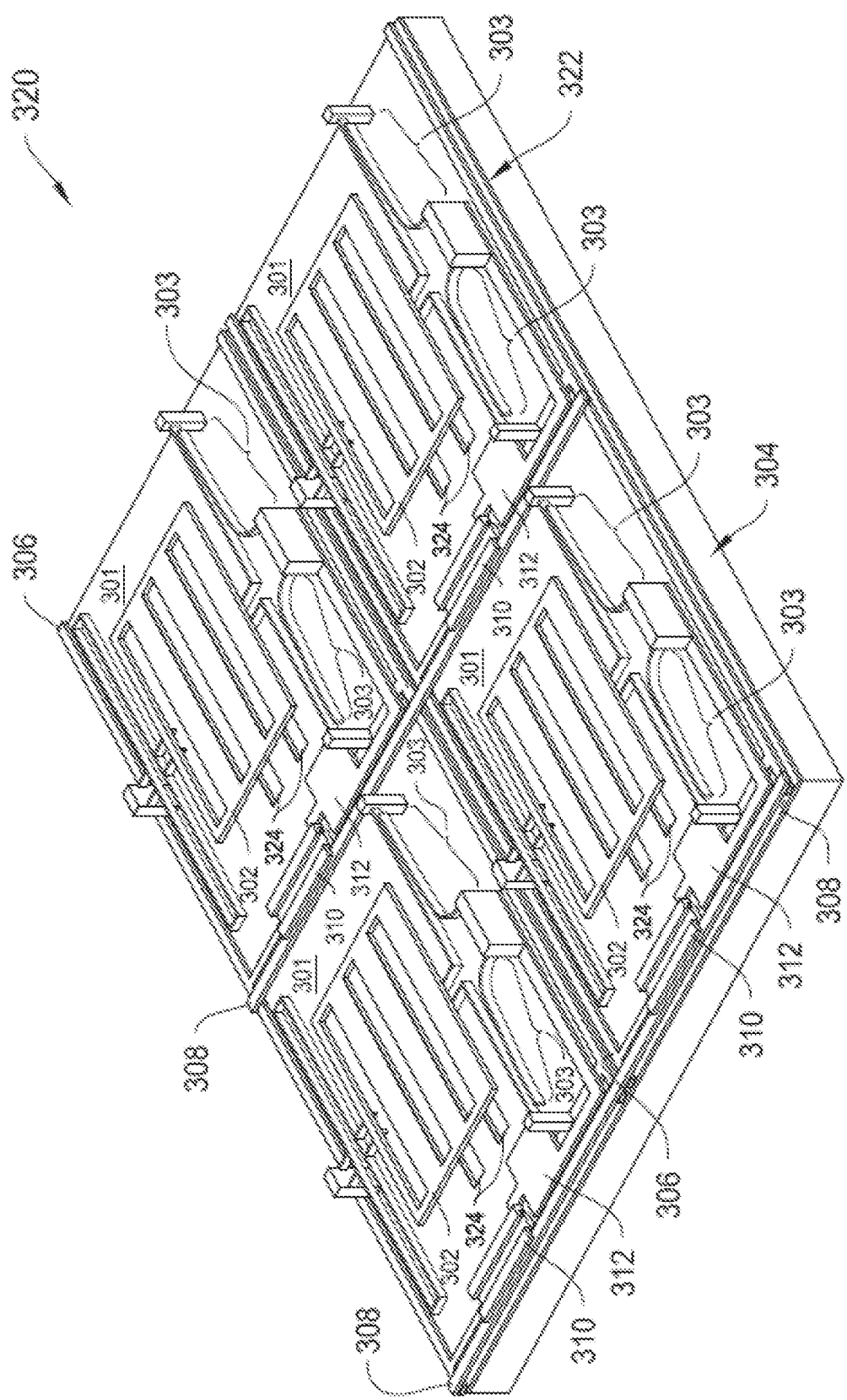
FIG. 3B shows a perspective view of an example array of shutter-based light modulators connected to the control matrix of FIG. 3A.

FIG. 3A shows an example schematic diagram of a control matrix 300. The control matrix 300 is suitable for controlling the light modulators incorporated into the MEMS-based display apparatus 100 of FIG. 1A. FIG. 3B shows a perspective view of an example array 320 of shutter-based light modulators connected to the control matrix 300 of FIG. 3A. The control matrix 300 may address an array of pixels 320 (the "array 320"). Each pixel 301 can include an elastic shutter assembly 302, such as the shutter assembly 200 of FIG. 2A, controlled by an actuator 303. Each pixel also can include an aperture layer 322 that includes apertures 324.

The control matrix 300 is fabricated as a diffused or thin-film-deposited electrical circuit on the surface of a substrate 304 on which the shutter assemblies 302 are formed. The control matrix 300 includes a scan-line interconnect 306 for each row of pixels 301 in the control matrix 300 and a data-interconnect 308 for each column of pixels 301 in the control matrix 300. Each scan-line interconnect 306 electrically connects a write-enabling voltage source 307 to the pixels 301 in a corresponding row of pixels 301. Each data interconnect 308 electrically connects a data voltage source 309 ("$V_d$ source") to the pixels 301 in a corresponding column of pixels. In the control matrix 300, the $V_d$ source 309 provides the majority of the energy to be used for actuation of the shutter assemblies 302. Thus, the data voltage source, $V_d$ source 309, also serves as an actuation voltage source.

Referring to FIGS. 3A and 3B, for each pixel 301 or for each shutter assembly 302 in the array of pixels 320, the control matrix 300 includes a transistor 310 and a capacitor 312. The gate of each transistor 310 is electrically connected to the scan-line interconnect 306 of the row in the array 320 in which the pixel 301 is located. The source of each transistor 310 is electrically connected to its corresponding data interconnect 308. The actuators 303 of each shutter assembly 302 include two electrodes. The drain of each transistor 310 is electrically connected in parallel to one electrode of the corresponding capacitor 312 and to one of the electrodes of the corresponding actuator 303. The other electrode of the capacitor 312 and the other electrode of the actuator 303 in shutter assembly 302 are connected to a common or ground potential. In alternate implementations, the transistors 310 can be replaced with semiconductor diodes and or metal-insulator-metal sandwich type switching elements.

In operation, to form an image, the control matrix 300 write-enables each row in the array 320 in a sequence by applying $V_{we}$ to each scan-line interconnect 306 in turn. For a write-enabled row, the application of $V_{we}$ to the gates of the transistors 310 of the pixels 301 in the row allows the flow of current through the data interconnects 308 through the transistors 310 to apply a potential to the actuator 303 of the shutter assembly 302. While the row is write-enabled, data voltages $V_d$ are selectively applied to the data interconnects 308. In implementations providing analog gray scale, the data voltage applied to each data interconnect 308 is varied in relation to the desired brightness of the pixel 301 located at the intersection of the write-enabled scan-line interconnect 306 and the data interconnect 308. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 308, the actuator 303 in the corresponding shutter assembly actuates, opening the shutter in that shutter assembly 302. The voltage applied to the data interconnect 308 remains stored in the capacitor 312 of the pixel 301 even after the control matrix 300 ceases to apply $V_{we}$ to a row. Therefore, the voltage $V_{we}$ does not have to wait and hold on a row for times long enough for the shutter assembly 302 to actuate; such actuation can proceed after the write-enabling voltage has been removed from the row. The capacitors 312 also function as memory elements within the array 320, storing actuation instructions for the illumination of an image frame.

The pixels 301 as well as the control matrix 300 of the array 320 are formed on a substrate 304. The array 320 includes an aperture layer 322, disposed on the substrate 304, which includes a set of apertures 324 for respective pixels 301 in the array 320. The apertures 324 are aligned with the shutter assemblies 302 in each pixel. In some implementations, the substrate 304 is made of a transparent material, such as glass or plastic. In some other implementations, the substrate 304 is made of an opaque material, but in which holes are etched to form the apertures 324.

The shutter assembly 302 together with the actuator 303 can be made bi-stable. That is, the shutters can exist in at least two equilibrium positions (e.g., open or closed) with little or no power required to hold them in either position. More particularly, the shutter assembly 302 can be mechanically bi-stable. Once the shutter of the shutter assembly 302 is set in position, no electrical energy or holding voltage is required to maintain that position. The mechanical stresses on the physical elements of the shutter assembly 302 can hold the shutter in place.

The shutter assembly 302 together with the actuator 303 also can be made electrically bi-stable. In an electrically bi-stable shutter assembly, there exists a range of voltages below the actuation voltage of the shutter assembly, which if applied to a closed actuator (with the shutter being either open or closed), holds the actuator closed and the shutter in position, even if an opposing force is exerted on the shutter. The opposing force may be exerted by a spring such as the spring 207 in the shutter-based light modulator 200 depicted in FIG. 2A, or the opposing force may be exerted by an opposing actuator, such as an "open" or "closed" actuator.

The light modulator array 320 is depicted as having a single MEMS light modulator per pixel. Other implementations are possible in which multiple MEMS light modulators are provided in each pixel, thereby providing the possibility of more than just binary "on" or "off" optical states in each pixel. Certain forms of coded area division gray scale are possible where multiple MEMS light modulators in the pixel are provided, and where apertures 324, which are associated with each of the light modulators, have unequal areas.

In some other implementations, the roller-based light modulator 220, the light tap 250, or the electrowetting-based light modulation array 270, as well as other MEMS-based light modulators, can be substituted for the shutter assembly 302 within the light modulator array 320.

FIGS. 4A and 4B show example views of a dual actuator shutter assembly 400. The dual actuator shutter assembly 400, as depicted in FIG. 4A, is in an open state. FIG. 4B shows the dual actuator shutter assembly 400 in a closed state. In contrast to the shutter assembly 200, the shutter assembly 400 includes actuators 402 and 404 on either side of a shutter 406. Each actuator 402 and 404 is independently controlled. A first actuator, a shutter-open actuator 402, serves to open the shutter 406. A second opposing actuator, the shutter-close actuator 404, serves to close the shutter 406. Both of the actuators 402 and 404 are compliant beam electrode actuators. The actuators 402 and 404 open and close the shutter 406 by driving the shutter 406 substantially in a plane parallel to an aperture layer 407 over which the shutter is suspended. The shutter 406 is suspended a short distance over the aperture layer 407 by anchors 408 attached to the actuators 402 and 404. The inclusion of supports attached to both ends of the shutter 406 along its axis of movement reduces out of plane motion of the shutter 406 and confines the motion substantially to a plane parallel to the substrate. By analogy to the control matrix 300 of FIG. 3A, a control matrix suitable for use with the shutter assembly 400 might include one transistor and one capacitor for each of the opposing shutter-open and shutter-close actuators 402 and 404.

The shutter 406 includes two shutter apertures 412 through which light can pass. The aperture layer 407 includes a set of three apertures 409. In FIG. 4A, the shutter assembly 400 is in the open state and, as such, the shutter-open actuator 402 has been actuated, the shutter-close actuator 404 is in its relaxed position, and the centerlines of the shutter apertures 412 coincide with the centerlines of two of the aperture layer apertures 409. In FIG. 4B the shutter assembly 400 has been moved to the closed state and, as such, the shutter-open actuator 402 is in its relaxed position, the shutter-close actuator 404 has been actuated, and the light blocking portions of the shutter 406 are now in position to block transmission of light through the apertures 409 (depicted as dotted lines).

Each aperture has at least one edge around its periphery. For example, the rectangular apertures 409 have four edges. In alternative implementations in which circular, elliptical, oval, or other curved apertures are formed in the aperture layer 407, each aperture may have only a single edge. In some other implementations, the apertures need not be separated or disjoint in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through apertures 412 and 409 in the open state, it is advantageous to provide a width or size for shutter apertures 412 which is larger than a corresponding width or size of apertures 409 in the aperture layer 407. In order to effectively block light from escaping in the closed state, it is preferable that the light blocking portions of the shutter 406 overlap the apertures 409. FIG. 4B shows a predefined overlap 416 between the edge of light blocking portions in the shutter 406 and one edge of the aperture 409 formed in the aperture layer 407.

The electrostatic actuators 402 and 404 are designed so that their voltage-displacement behavior provides a bi-stable characteristic to the shutter assembly 400. For each of the shutter-open and shutter-close actuators there exists a range of voltages below the actuation voltage, which if applied while that actuator is in the closed state (with the shutter being either open or closed), will hold the actuator closed and the shutter in position, even after an actuation voltage is applied to the opposing actuator. The minimum voltage needed to maintain a shutter's position against such an opposing force is referred to as a maintenance voltage $V_m$.

Figure 5:
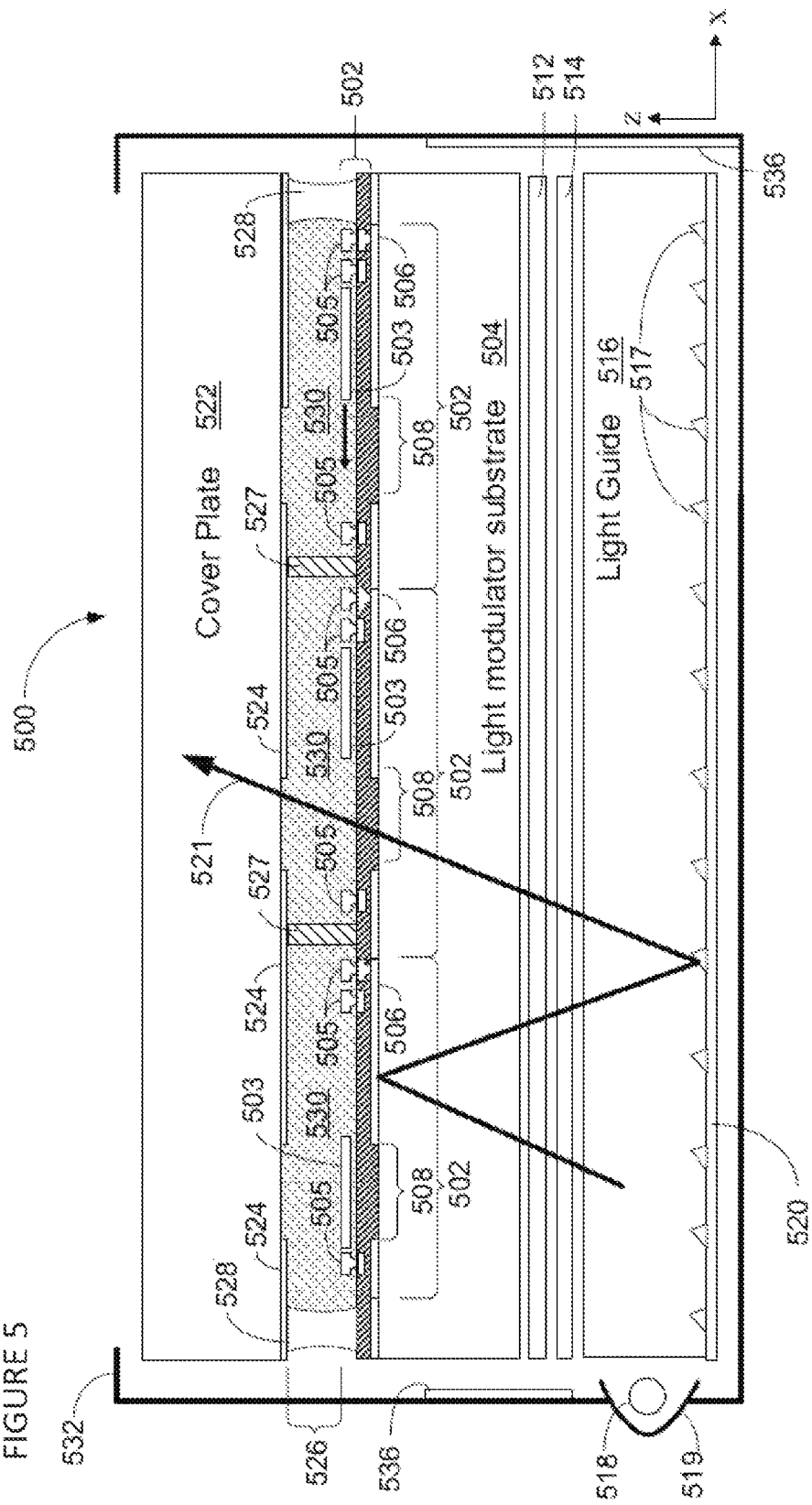
FIG. 5 shows an example cross sectional view of a display apparatus incorporating shutter-based light modulators.

FIG. 5 shows an example cross sectional view of a display apparatus 500 incorporating shutter-based light modulators (shutter assemblies) 502. Each shutter assembly 502 incorporates a shutter 503 and an anchor 505. Not shown are the compliant beam actuators which, when connected between the anchors 505 and the shutters 503, help to suspend the shutters 503 a short distance above the surface. The shutter assemblies 502 are disposed on a transparent substrate 504, such a substrate made of plastic or glass. A rear-facing reflective layer, reflective film 506, disposed on the substrate 504 defines a plurality of surface apertures 508 located beneath the closed positions of the shutters 503 of the shutter assemblies 502. The reflective film 506 reflects light not passing through the surface apertures 508 back towards the rear of the display apparatus 500. The reflective aperture layer 506 can be a fine-grained metal film without inclusions formed in thin film fashion by a number of vapor deposition techniques including sputtering, evaporation, ion plating, laser ablation, or chemical vapor deposition (CVD). In some other implementations, the rear-facing reflective layer 506 can be formed from a mirror, such as a dielectric mirror. A dielectric mirror can be fabricated as a stack of dielectric thin films which alternate between materials of high and low refractive index. The vertical gap which separates the shutters 503 from the reflective film 506, within which the shutter is free to move, is in the range of 0.5 to 10 microns. The magnitude of the vertical gap is preferably less than the lateral overlap between the edge of shutters 503 and the edge of apertures 508 in the closed state, such as the overlap 416 depicted in FIG. 4B.

The display apparatus 500 includes an optional diffuser 512 and/or an optional brightness enhancing film 514 which separate the substrate 504 from a planar light guide 516. The light guide 516 includes a transparent, i.e., glass or plastic material. The light guide 516 is illuminated by one or more light sources 518, forming a backlight. The light sources 518 can be, for example, and without limitation, incandescent lamps, fluorescent lamps, lasers or light emitting diodes (LEDs). A reflector 519 helps direct light from lamp 518 towards the light guide 516. A front-facing reflective film 520 is disposed behind the backlight 516, reflecting light towards the shutter assemblies 502. Light rays such as ray 521 from the backlight that do not pass through one of the shutter assemblies 502 will be returned to the backlight and reflected again from the film 520. In this fashion light that fails to leave the display apparatus 500 to form an image on the first pass can be recycled and made available for transmission through other open apertures in the array of shutter assemblies 502. Such light recycling has been shown to increase the illumination efficiency of the display.

The light guide 516 includes a set of geometric light redirectors or prisms 517 which re-direct light from the lamps 518 towards the apertures 508 and hence toward the front of the display. The light redirectors 517 can be molded into the plastic body of light guide 516 with shapes that can be alternately triangular, trapezoidal, or curved in cross section. The density of the prisms 517 generally increases with distance from the lamp 518.

In some implementations, the aperture layer 506 can be made of a light absorbing material, and in alternate implementations the surfaces of shutter 503 can be coated with either a light absorbing or a light reflecting material. In some other implementations, the aperture layer 506 can be deposited directly on the surface of the light guide 516. In some implementations, the aperture layer 506 need not be disposed on the same substrate as the shutters 503 and anchors 505 (such as in the MEMS-down configuration described below).

In some implementations, the light sources 518 can include lamps of different colors, for instance, the colors red, green and blue. A color image can be formed by sequentially illuminating images with lamps of different colors at a rate sufficient for the human brain to average the different colored images into a single multi-color image. The various color-specific images are formed using the array of shutter assemblies 502. In another implementation, the light source 518 includes lamps having more than three different colors. For example, the light source 518 may have red, green, blue and white lamps, or red, green, blue and yellow lamps. In some other implementations, the light source 518 may include cyan, magenta, yellow and white lamps, red, green, blue and white lamps. In some other implementations, additional lamps may be included in the light source 518. For example, if using five colors, the light source 518 may include red, green, blue, cyan and yellow lamps. In some other implementations, the light source 518 may include white, orange, blue, purple and green lamps or white, blue, yellow, red and cyan lamps. If using six colors, the light source 518 may include red, green, blue, cyan, magenta and yellow lamps or white, cyan, magenta, yellow, orange and green lamps.

A cover plate 522 forms the front of the display apparatus 500. The rear side of the cover plate 522 can be covered with a black matrix 524 to increase contrast. In alternate implementations the cover plate includes color filters, for instance distinct red, green, and blue filters corresponding to different ones of the shutter assemblies 502. The cover plate 522 is supported a predetermined distance away from the shutter assemblies 502 forming a gap 526. The gap 526 is maintained by mechanical supports or spacers 527 and/or by an adhesive seal 528 attaching the cover plate 522 to the substrate 504.

The adhesive seal 528 seals in a fluid 530. The fluid 530 is engineered with viscosities preferably below about 10 centipoise and with relative dielectric constant preferably above about 2.0, and dielectric breakdown strengths above about $10^4$ V/cm. The fluid 530 also can serve as a lubricant. In some implementations, the fluid 530 is a hydrophobic liquid with a high surface wetting capability. In alternate implementations, the fluid 530 has a refractive index that is either greater than or less than that of the substrate 504.

Displays that incorporate mechanical light modulators can include hundreds, thousands, or in some cases, millions of moving elements. In some devices, every movement of an element provides an opportunity for static friction to disable one or more of the elements. This movement is facilitated by immersing all the parts in a fluid (also referred to as fluid 530) and sealing the fluid (such as with an adhesive) within a fluid space or gap in a MEMS display cell. The fluid 530 is usually one with a low coefficient of friction, low viscosity, and minimal degradation effects over the long term. When the MEMS-based display assembly includes a liquid for the fluid 530, the liquid at least partially surrounds some of the moving parts of the MEMS-based light modulator. In some implementations, in order to reduce the actuation voltages, the liquid has a viscosity below 70 centipoise. In some other implementations, the liquid has a viscosity below 10 centipoise. Liquids with viscosities below 70 centipoise can include materials with low molecular weights: below 4000 grams/mole, or in some cases below 400 grams/mole. Fluids 530 that also may be suitable for such implementations include, without limitation, de-ionized water, methanol, ethanol and other alcohols, paraffins, olefins, ethers, silicone oils, fluorinated silicone oils, or other natural or synthetic solvents or lubricants. Useful fluids can be polydimethylsiloxanes (PDMS), such as hexamethyldisiloxane and octamethyltrisiloxane, or alkyl methyl siloxanes such as hexylpentamethyldisiloxane. Useful fluids can be alkanes, such as octane or decane. Useful fluids can be nitroalkanes, such as nitromethane. Useful fluids can be aromatic compounds, such as toluene or diethylbenzene. Useful fluids can be ketones, such as butanone or methyl isobutyl ketone. Useful fluids can be chlorocarbons, such as chlorobenzene. Useful fluids can be chlorofluorocarbons, such as dichlorofluoroethane or chlorotrifluoroethylene. Other fluids considered for these display assemblies include butyl acetate and dimethylformamide. Still other useful fluids for these displays include hydro fluoro ethers, perfluoropolyethers, hydro fluoro poly ethers, pentanol, and butanol. Example suitable hydro fluoro ethers include ethyl nonafluorobutyl ether and 2-trifluoromethyl-3-ethoxydodecafluorohexane.

A sheet metal or molded plastic assembly bracket 532 holds the cover plate 522, the substrate 504, the backlight and the other component parts together around the edges. The assembly bracket 532 is fastened with screws or indent tabs to add rigidity to the combined display apparatus 500. In some implementations, the light source 518 is molded in place by an epoxy potting compound. Reflectors 536 help return light escaping from the edges of the light guide 516 back into the light guide 516. Not depicted in FIG. 5 are electrical interconnects which provide control signals as well as power to the shutter assemblies 502 and the lamps 518.

In some other implementations, roller shade-based light modulator, the light tap 250 shown in FIG. 2B, or other MEMS-based light modulators, can be substituted for the shutter assemblies 502 within the display apparatus 500.

The display apparatus 500 is referred to as the MEMS-up configuration, wherein the MEMS based light modulators are formed on a front surface of the substrate 504, i.e., the surface that faces toward the viewer. The shutter assemblies 502 are built directly on top of the reflective aperture layer 506. In an alternate implementation, referred to as the MEMS-down configuration, the shutter assemblies are disposed on a substrate separate from the substrate on which the reflective aperture layer is formed. The substrate on which the reflective aperture layer is formed, defining a plurality of apertures, is referred to herein as the aperture plate. In the MEMS-down configuration, the substrate that carries the MEMS-based light modulators takes the place of the cover plate 522 in the display apparatus 500 and is oriented such that the MEMS-based light modulators are positioned on the rear surface of the top substrate, i.e., the surface that faces away from the viewer and toward the light guide 516. The MEMS-based light modulators are thereby positioned directly opposite to and across a gap from the reflective aperture layer 506. The gap can be maintained by a series of spacer posts connecting the aperture plate and the substrate on which the MEMS modulators are formed. In some implementations, the spacers are disposed within or between each pixel in the array. The gap or distance that separates the MEMS light modulators from their corresponding apertures is preferably less than 10 microns, or a distance that is less than the overlap between shutters and apertures, such as overlap 416.

Figure 6:
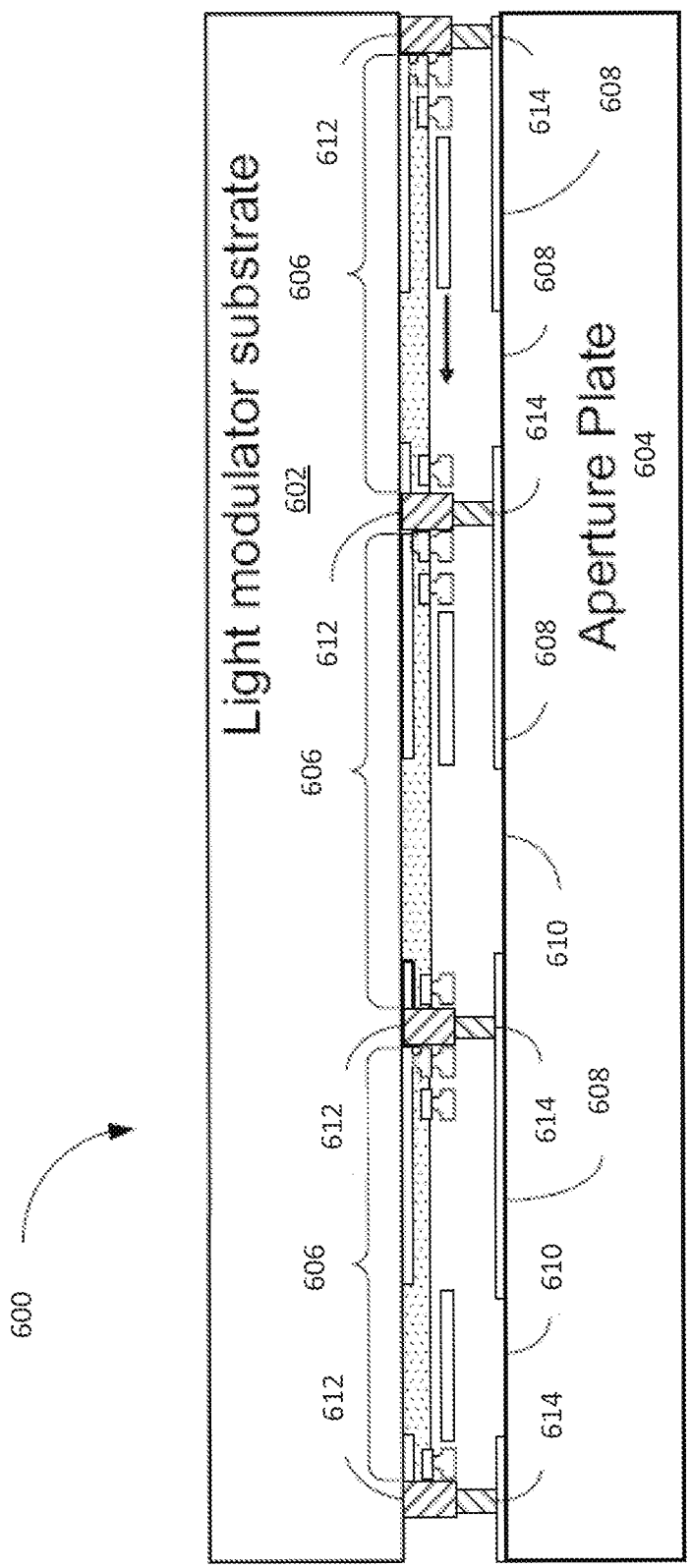
FIG. 6 shows a cross sectional view of an example light modulator substrate and an example aperture plate for use in a MEMS-down configuration of a display.

FIG. 6 shows a cross sectional view of an example light modulator substrate and an example aperture plate for use in a MEMS-down configuration of a display. The display assembly 600 includes a modulator substrate 602 and an aperture plate 604. The display assembly 600 also includes a set of shutter assemblies 606 and a reflective aperture layer 608. The reflective aperture layer 608 includes apertures 610. A predetermined gap or separation between the modulator substrates 602 and the aperture plate 604 is maintained by the opposing set of spacers 612 and 614. The spacers 612 are formed on or as part of the modulator substrate 602. The spacers 614 are formed on or as part of the aperture plate 604. During assembly, the two substrates 602 and 604 are aligned so that spacers 612 on the modulator substrate 602 make contact with their respective spacers 614.

The separation or distance of this illustrative example is 8 microns. To establish this separation, the spacers 612 are 2 microns tall and the spacers 614 are 6 microns tall. Alternately, both spacers 612 and 614 can be 4 microns tall, or the spacers 612 can be 6 microns tall while the spacers 614 are 2 microns tall. In fact, any combination of spacer heights can be employed as long as their total height establishes the desired separation H12.

Providing spacers on both of the substrates 602 and 604, which are then aligned or mated during assembly, has advantages with respect to materials and processing costs. The provision of a very tall, such as larger than 8 micron spacers, can be costly as it can require relatively long times for the cure, exposure, and development of a photo-imageable polymer. The use of mating spacers as in display assembly 600 allows for the use of thinner coatings of the polymer on each of the substrates.

In another implementation, the spacers 612 which are formed on the modulator substrate 602 can be formed from the same materials and patterning blocks that were used to form the shutter assemblies 606. For instance, the anchors employed for shutter assemblies 606 also can perform a function similar to spacer 612. In this implementation, a separate application of a polymer material to form a spacer would not be required and a separate exposure mask for the spacers would not be required.

Figure 7:
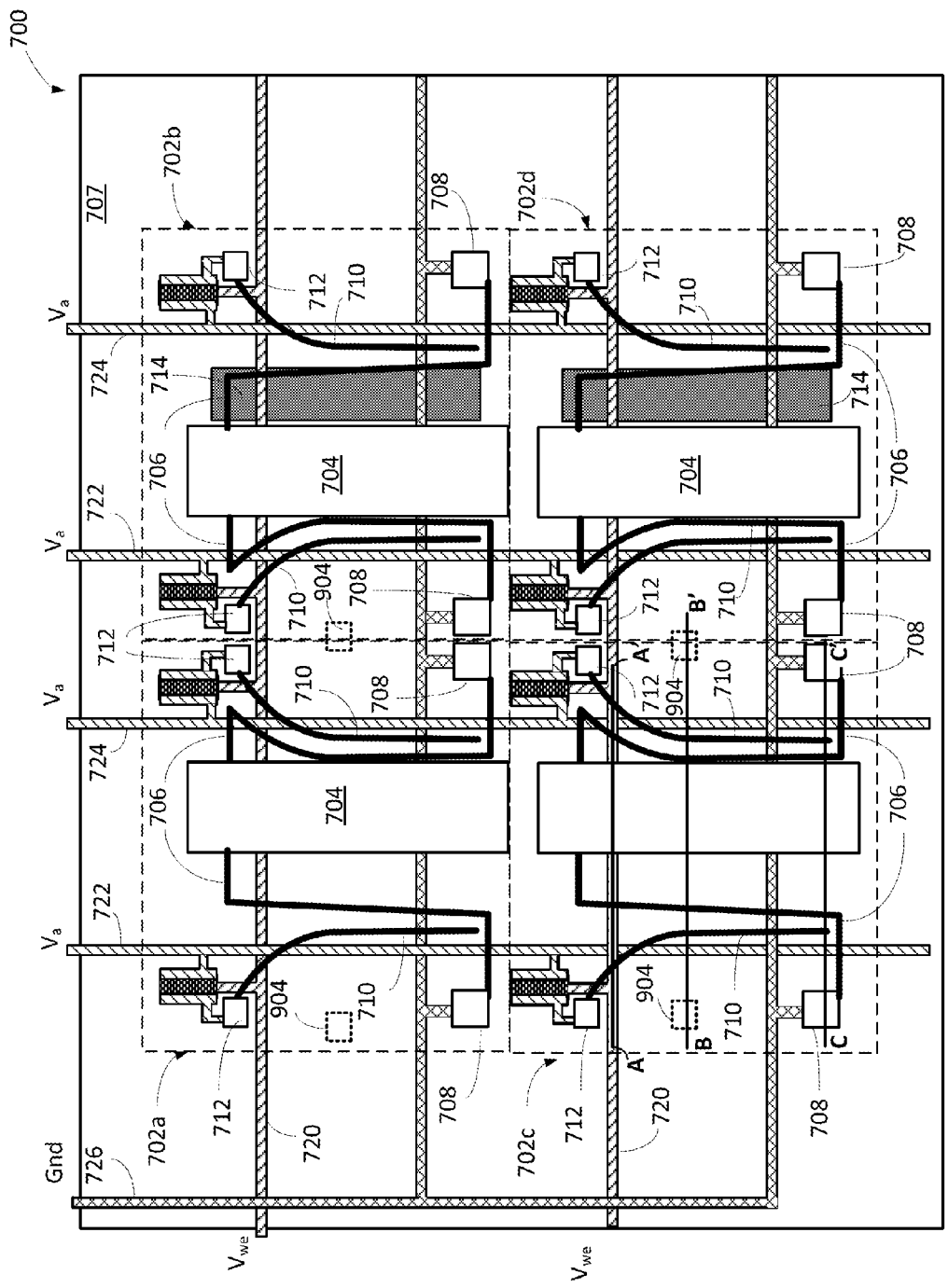
FIG. 7 shows a plan view of an example array of EMS display elements.

FIG. 7 shows a plan view of an example array 700 of EMS display elements 702a-702d (generally "display elements 702"). Each display element 702 includes a shutter 704. Two compliant load beams 706 couple the shutter 704 to respective shutter anchors 708. The shutter anchors 708 support the load beams 706 and the shutter 704 over a light blocking layer 707. Drive beams 710 are positioned adjacent to the respective load beams 706. The drive beams 710 are supported over the light blocking layer 707 by corresponding drive anchors 712.

Each load beam 706—drive beam 710 pair serves as an electrostatic actuator. Thus, each display element 702 includes two actuators: a shutter-open actuator and a shutter-close actuator. The actuators are configured to move their respective shutter 704 into and out of alignment with a corresponding aperture 714 defined through the light blocking layer 707 to modulate light. For example, the shutters 704 in display elements 702a and 702c are in a closed position, blocking their corresponding apertures 714. The shutters 704 in display elements 702b and 702d, on the other hand, are in the open position, allowing light to pass through their corresponding apertures 714.

The actuators are controlled by a control matrix, which may be similar to the control matrix 300 shown in FIG. 3A. The control matrix included in the array 700 differs from the control matrix 300 in a few respects. First, the control matrix 300 was configured to control the shutter assemblies 200 shown in FIG. 2A. The shutter assemblies 200 only included a single actuator, whereas the display elements 702 depicted in FIG. 7 include both shutter-open and shutter-close actuators. As a result the control matrix included in the array 700 includes circuitry for controlling two actuators per display element 702, instead of only one. In addition, the control matrix in the array 700 omits a capacitor similar to the capacitor 312 shown in FIG. 3A. Instead, the display elements 702 in FIG. 7 rely on the inherent capacitance of their corresponding actuators.

Thus, the control matrix included in the array 700 includes a write-enabling interconnect 720 for each row of display elements 702, a shutter-open data interconnect 722 and a shutter-close data interconnect 724 for each column of display elements 702, and a common interconnect 725 providing a shared ground voltage to display elements in multiple rows and multiple columns of display elements 702. The write-enabling interconnect 720, the shutter open-interconnect 722, and the shutter-close interconnect 724 are electrically isolated from the shutter 704. The control matrix also includes two transistors 726 in each display element 702, one for each actuator. In operation, the write-enabling interconnects 720 can be switched between being at about ground and a write-enabling voltage of about 3V to about 7V. The shutter-open and shutter-close interconnects 722 and 724 can be switched between ground and an actuation voltage, $V_a$, which, depending on the specific configuration of the display element 702, ranges from about 15V to about 40V.

The control matrix used to control the display elements 702 can be implemented to operate similarly to the control matrix 300 shown in FIG. 3A. More particularly, each row of shutter assemblies is addressed and actuated, one row at a time. To address and actuate a display element 702, $V_{we}$ is applied to the write-enabling interconnect 720 corresponding to the row of the array 700 in which the display element 702 is located. The write-enabling interconnect 720 couples to the gates of the transistors 726 of the display elements 702 in its row. Applying $V_{we}$ to the gate of the transistors 726 allows the actuators in those display elements 702 to respond to actuation voltages provided by the shutter-open and shutter-close interconnects 722 and 724. $V_a$ is then applied to either the shutter-open interconnect 722 or the shutter-close interconnect 724 of the column in the array 700 in which the display element 702 is located, according to image data communicated to the array 700. The application of $V_a$ causes the respective display elements 702 to move into a state indicated by the image data.

As shown in FIG. 7, the write-enabling and common interconnects 720 and 725 pass directly under the load beams 706, the drive beams 710 and the shutter 704 of each display element 702. In addition, the shutter-open and shutter-close interconnects 722 and 724 pass underneath the drive beams 710 of the display elements to which they couple in both the open and closed states. As shown in FIG. 7, when a display element 702 is in the open state, the shutter-open interconnect 722 also passes under one of the load beams 706 of the display element 702. Additionally, when a display element 702 is in a closed state, the shutter-close interconnect 724 passes under the other load beam 706 of the display element 702. In some other implementations, the shutter-close interconnects 722 may always pass under their corresponding load beams 706. In still some other implementations, the shutter-close interconnects may not pass under their corresponding load beams 706 in either the open or closed states.

In some other implementations, other control matrix architectures and designs can be used. For example, only the write enabling interconnects 720, or only the shutter-open or shutter-close interconnects 722 or 724 are routed underneath suspended components of the display elements 702. Other control matrices may include either only one transistor per display element or more than two transistors per display element.

In some other implementations, the control matrix includes separate data interconnects and actuation interconnects, whereas the shutter-open interconnects 722 and shutter-close interconnects 724 shown in FIG. 7 effectively serve both roles. In some implementations incorporating separate data and actuation interconnects, both the data and actuation interconnects are routed underneath one or more suspended components of the display elements 702. In some other implementations, only the data interconnects, or only the actuation interconnects are routed under one or more suspended components of the display elements 702.

In still other implementations, the control matrix in the array 700 includes one or more switched global interconnects, such as a global actuation interconnect, that couples to display elements in multiple rows and multiple columns of display elements. In such implementations, one or more of the global interconnects may be routed under one or more suspended components of the display elements 702.

This control matrix configuration allows for greater display element packing density or increased aperture ratio, as less room is needed between display elements for electrical interconnects. However, having the interconnects 720, 722 and 724 pass underneath the mechanical components (i.e., the load beams 706, the drive beams 710, and the shutters 704) of the display elements 702 increases the risk of performance degradation or device failure due to electrostatic attraction between the interconnects and the mechanical components and increased interconnect capacitance. Various configurations of display apparatus that include the array 700 of display elements 702, while mitigating this risk, are disclosed below in relation to FIGS. 8-11.

Figure 8:
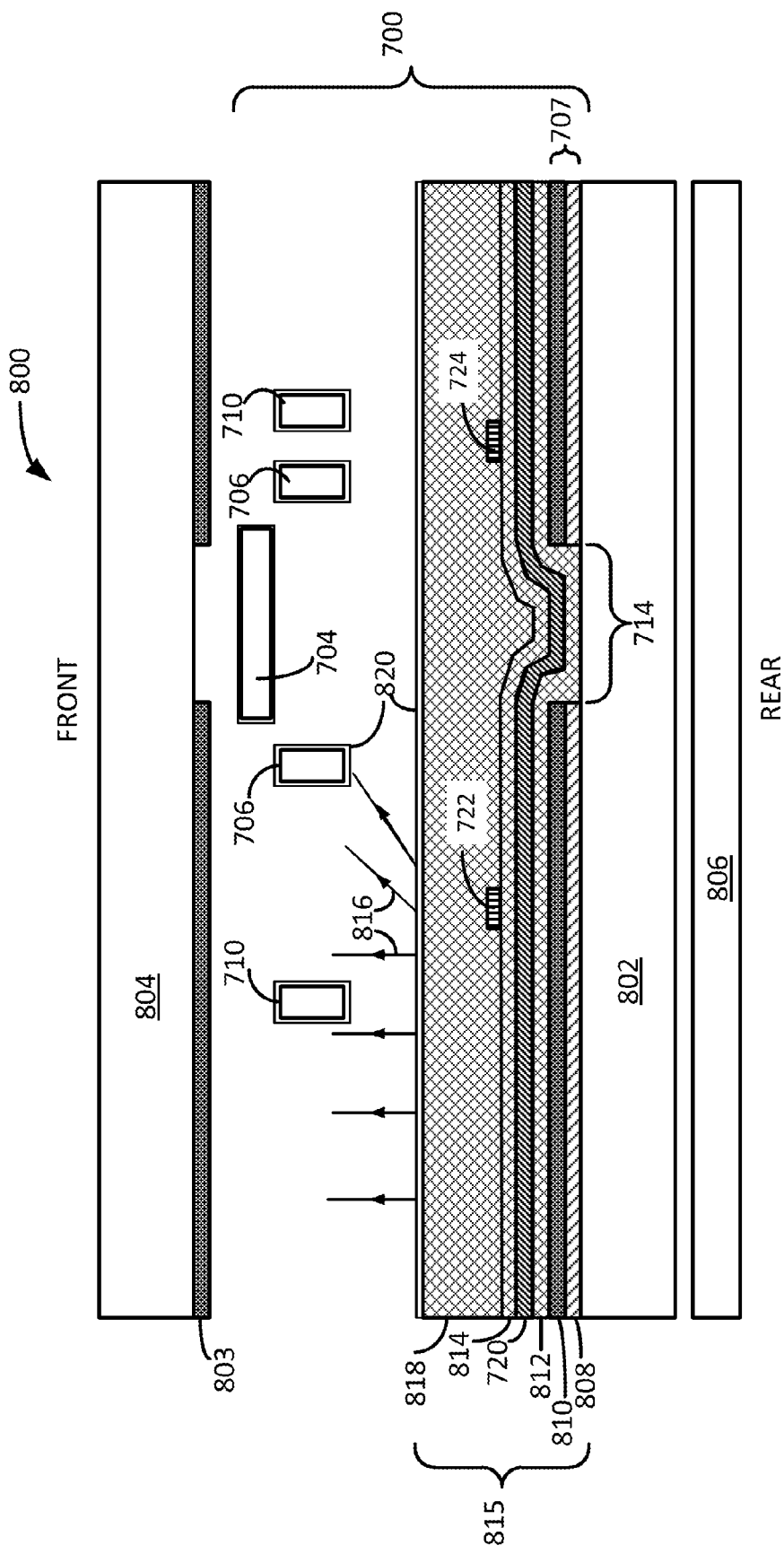
FIGS. 8-11 show cross sectional views of example display apparatus incorporating the array of display elements shown in FIG. 7.
Figure 9:
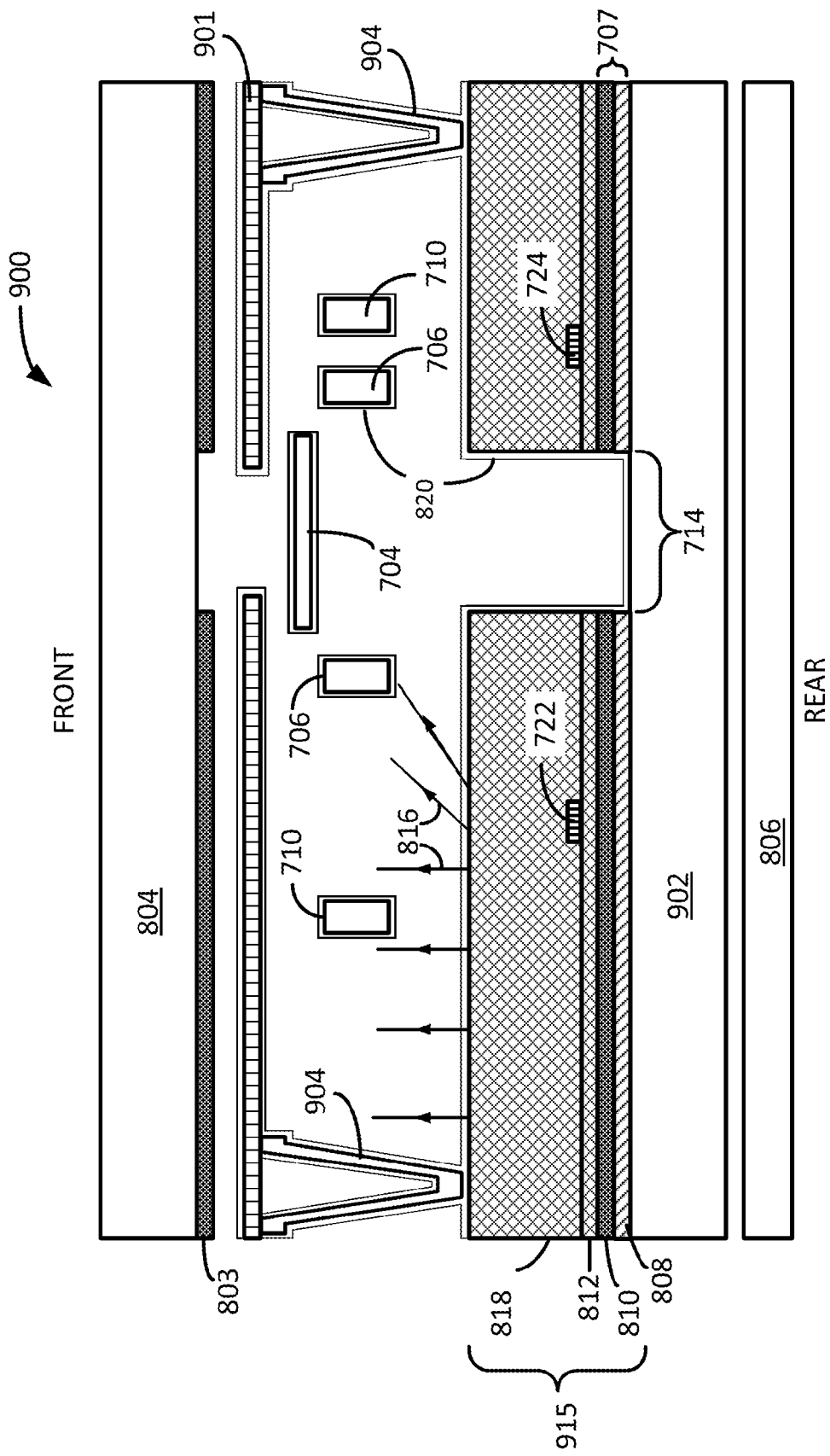
Figure 10:
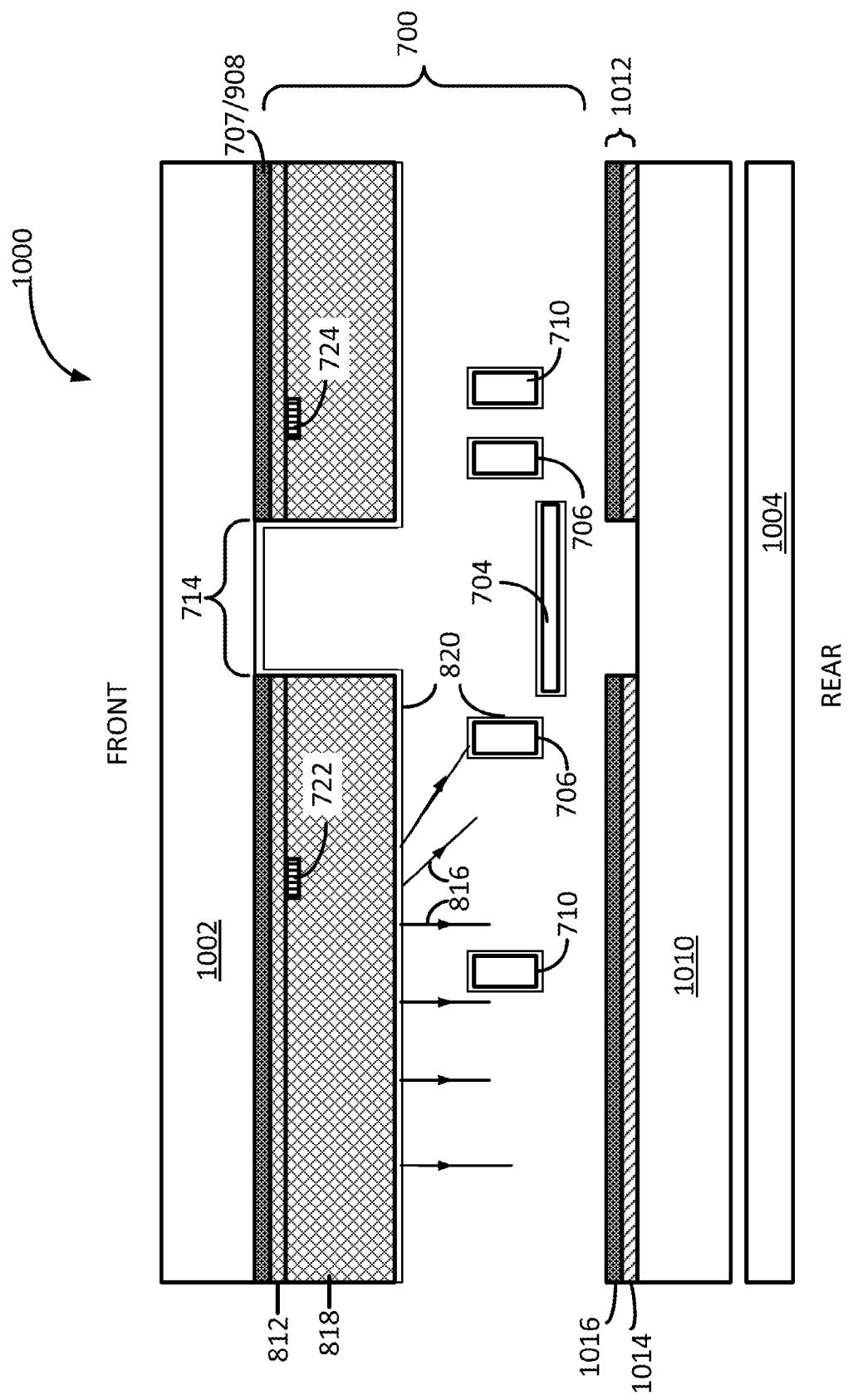
Figure 11:
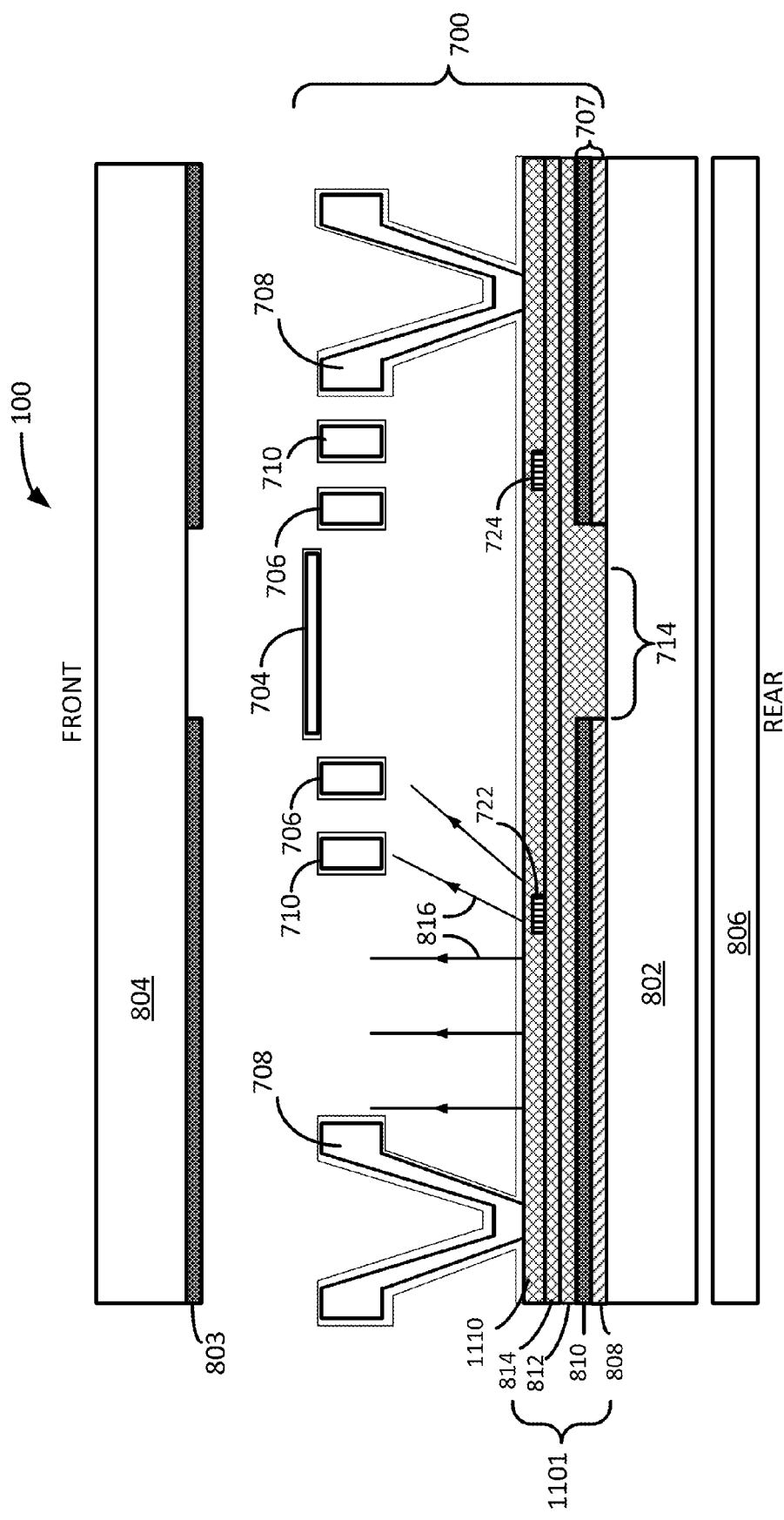

FIGS. 8-11 show cross sectional views of example display apparatus 800, 900, 1000 and 1100 incorporating the array 700 of display elements 702 shown in FIG. 7. FIGS. 8-10 show cross sections of display apparatus that mitigate the risk posed by unwanted electrostatic attraction and increased capacitance by introducing a relatively thick electric insulation layer between the uppermost layer of the control matrix of the array 700 and the load beams 706, drive beams 710 and shutter 704 of the display elements 702. FIG. 11 mitigates the risk by increasing the distance between the uppermost layer of the control matrix and the load beams 706, drive beams 710 and the shutter 704 of the display elements 702 without including the thick layer of insulation.

FIG. 8 shows a cross sectional view of an example display apparatus 800 incorporating the array 700 of display elements 702 shown in FIG. 7. The cross-sectional view shown in FIG. 8 is taken along line A-A' of FIG. 7. The display apparatus 800 is built in a MEMS-up configuration similar to the display apparatus 500 shown in FIG. 5. That is, the array 700 is fabricated on a transparent substrate 802 positioned towards the rear of the display apparatus 800 and faces up towards a light blocking layer 803 coupled to a cover sheet 804 that forms the front of the display apparatus 800. The substrate 802 is positioned in front of a backlight 806. Light emitted by the backlight 806 passes through apertures 714 formed in the light blocking layer 707 to be modulated by the shutters 704. While the backlight 806 is shown as being spaced apart from the substrate 802 in FIG. 8, in some other implementations, the two components are in intimate contact or separated by only a very thin air gap.

In the display apparatus 800, the light blocking layer 707 includes two layers, a reflective layer 808 and a light absorbing layer 810. The reflective layer reflects light that escapes the backlight 806, but fails to pass through the apertures 714, back towards the backlight 806 to be recycled. The light absorbing layer 810 absorbs light reflecting off the rear-facing surfaces of the shutters 704, as well as stray ambient light that may have entered the front of the display apparatus 800.

The display apparatus 800 includes mechanical components and a control matrix 815. The mechanical components include the shutters 704, load beams 706, load anchors 708, drive beams 710, and drive anchors 712 shown in FIG. 7.

In the control matrix 815, a first dielectric layer 812 separates the light absorbing layer 810 from the write-enabling interconnects 720. A second dielectric layer 814 separates the write enabling interconnects 720 from the shutter-open and shutter-close interconnects 722 and 724. The first and second dielectric layers 812 and 814 are deposited in substantially conforming layers using a CVD plasma-enhanced chemical vapor deposition (PECVD), or other vapor deposition process to thicknesses of between about 0.1 microns and about 1 micron. They may be formed using any standard inter-metal dielectric (IMD) material commonly used in thin-film fabrication, such as silicon nitrides ($SiN_x$), silicon dioxide ($SiO_2$), or organic thin film layers, and for example planarization layers made of acrylics. In some implementations, the IMD is selected to be transparent, such as $SiN_x$, $SiO_2$, or one of the acrylic organic materials described above, such that its interference with the optical path through the apertures 714 of the display apparatus 800 are minimized. In some implementations, the IMD is selected to have an index of refraction that matches the substrate 802 and/or a fluid that fills the display apparatus 800, to reduce any reflections that might occur at the interface between the IMD and the fluid or the IMD and the substrate 802, respectively. In implementations in which the IMD is light absorbing and/or has a substantially different index of refraction than the substrate or the fluid, the IMD is removed from above the apertures 714, except where the IMD serves to insulate an interconnect crossing the apertures 714.

To reduce the strength of the electric field 816 between the switched interconnects (i.e., the write-enabling interconnects 720, the shutter-open interconnects 722, and the shutter-close interconnects 724) and the suspend components (i.e., the shutters 704, load beams 706, and drive beams 708) of the display elements 702, the display apparatus 800 includes a relatively thick layer of electrically insulating material 818. In some implementations, the electrically insulating material 818 is deposited using a spin-on process such that it also serves as a planarization layer to provide an even surface on which the fabricate the structural components of the display apparatus 800. A thin passivation layer 820 is then deposited on all exposed surfaces of the array 700.

In some implementations, the layer of electrically insulating material 818 is a dielectric. As with the IMD materials, in some implementations, the electrically insulating material 818 is chosen to be both transparent and to have an index of refraction that substantially matches the index of refraction of the substrate 802 and/or the fluid. In some other implementations, the electrically insulating material 818 is light absorbing and/or has a substantially different index of refraction than the substrate or the fluid. In such implementations, the electrically insulating material 818 is removed through an etching step from above the apertures 714, except where the electrically insulating material 818 serves to insulate an interconnect crossing the apertures 714. In some implementations, the electrically insulating material 818 is the same dielectric material used to form the first and second dielectric layers 812 and 814. The layer of electrically insulating material 818 decreases the strength of the electric field 816 both by its material properties, and by providing additional distance between the switched interconnects and the suspended components. Depending on the dielectric constant of the electrically insulating material 818, the dielectric constant of any other intervening medium between the electrically insulation material 818 and the suspended components of the display elements 702, and the gap between the switched interconnects and the suspended components, the electrically insulating material 818 also may reduce the capacitance of the interconnects. Accordingly, in some implementations, the electrically insulating material is selected such that it has a dielectric constant that is less than the dielectric constant of a fluid surrounding the display elements 702.

In some implementations, the layer of electrically insulating material 818 has a thickness ranging from greater than about 1 micron up to about 5 microns. In some other implementations, the layer of electrically insulating material 818 is between about 1.5 and about 4 microns thick. In some other implementations, the layer of electrically insulating material 818 is between about 2 and about 4 microns thick. In some other implementations, the layer of electrically insulating material 818 is about 3 microns thick. In some implementations, the suspended components of the display elements 702 are suspended at least 2 microns and less than 7 microns above the layer of electrically insulating material 818. In some other implementations, the suspended components are suspended between 4 and about 5 microns over the layer of electrically insulating material 818. In some implementations, the total distance in a direction normal to the substrate 802 between the uppermost switched interconnect and the closest suspended component is greater than about 3 microns and less than about 12 microns. In some other implementations, the total distance is between about 5 and about 9 microns.

FIG. 9 shows a cross sectional view of another example display apparatus 900 including the array 700 of display elements 702 shown in FIG. 7. The cross-sectional view is taken along the line B-B' in FIG. 7. The display apparatus 900 is similar to the display apparatus 800 of FIG. 8. However, in contrast to the display apparatus 800, the display apparatus 900 includes an elevated integrated aperture layer 901. The elevated integrated aperture layer 901 helps prevent stray light that bounces off the undersides of the shutters 704 from reaching the front of, and escaping, the display apparatus 900, thus improving the contrast ratio of the display apparatus 900.

The elevated integrated aperture layer 901 is supported over a rear substrate 902, on which the array 700 is fabricated, by pairs of aperture layer anchors 904. In some implementations, the elevated integrated aperture layer 901 is supported between about 1 and about 5 microns over the surface of the shutters 704 closest to the elevated integrated aperture layer 901. In some other implementations, the elevated integrated aperture layer 901 is supported between about 2 and about 4 microns over the surface of the shutters 704. In some other implementations, the elevated integrated aperture layer 901 is supported about 3 microns over the surface of the shutters 704.

Like the display apparatus 800 shown in FIG. 8, the display apparatus 900 shown in FIG. 9 includes a two-layer light absorbing layer 707, including a light reflective layer 808 and a light absorbing layer 810. The display apparatus 900 also includes a control matrix 915. The control matrix 915 includes first and second layers of dielectric material 812 and 814 formed from one or more IMD materials, and the thick layer of electrically insulating material 818. The second layer of dielectric material 814 is not visible in FIG. 9, as, during fabrication, the second layer of dielectric material 814 is etched away except where used to insulate the write-enabling interconnects 720, which are not present in the depicted cross section. The IMDs used in FIG. 9, as well as the electrically insulating material 818 are light absorbing. Therefore, they have been etched away over the aperture 720. In some other implementations, the IMDs and the electrically insulating material 818 are transparent. In such implementations, they may be left over the aperture 720. The thicknesses of the first and second dielectric layers 812 and 814 as well as the layer of electrically insulating material 818 can be the same as those set forth above with respect to the display apparatus 800.

FIG. 10 shows a cross section of yet another example display apparatus 1000 incorporating the array 700 of display elements 702 shown in FIG. 7. The cross-sectional view is also taken along line B-B' in FIG. 7. In contrast to the display apparatus 900, the display apparatus 1000 lacks an elevated integrated aperture layer. As such, FIG. 10 omits both the elevated integrated aperture layer 901 as well as the aperture layer anchors 904 shown in FIG. 9.

In addition, unlike the display apparatus 800 and 900 shown in FIGS. 8 and 9, the display apparatus 1000 shown in FIG. 10 is built in a MEMS-down configuration. That is, the array 700 is fabricated on a front substrate 1002 of the display apparatus 1000, facing back towards a backlight 1004. As a result, the light blocking layer 707 only includes a light absorbing layer 908. The display apparatus 1000 also includes a separate aperture plate substrate 1010 positioned between the array 700 and the backlight 1004. A second light blocking layer 1012 is formed on the aperture plate substrate 1010. This second light blocking layer 1012 includes a light reflecting layer 1014 and a light absorbing layer 1016.

Like the display apparatus 800 and 900, the display apparatus 1000 includes the relatively thick layer of electrically insulating material 818 deposited over the control matrix incorporated into the array 700.

FIG. 11 shows a cross-sectional view of yet another display apparatus 1100, which incorporates the array 700 of display elements 702 shown in FIG. 7. The cross-sectional view shown in FIG. 11 is taken along line C-C' shown in FIG. 7. Like the display apparatus 800 and 900, shown in FIGS. 8 and 9, the display apparatus 1100 is fabricated in a MEMS-up configuration. Accordingly, the array 700 is formed on a rear substrate 1102, proximate to a backlight 1104, and faces up towards a cover sheet 1106 at the front of the display apparatus 1100.

In contrast to the display apparatus 800, 900 and 1000 shown in FIGS. 8, 9 and 10, respectively, the display apparatus 1100 omits the thicker layer of electrically insulating material 818. Instead, the display apparatus 1100 relies solely on an increased distance between the uppermost interconnect of the control matrix 1101 incorporated into the array 700 and the suspended components of its display elements 702, to reduce the risk posed by undesirable electric fields and performance degradation results from increased capacitance. As such, the display apparatus 1100 includes taller load and drive anchors 708 and 712 than were included in the display apparatus 800, 900, and 100. With the taller anchors 708 and 712, the distance normal to the plane of the substrate 1102 between the uppermost interconnect in the control matrix and the and the nearest suspended components in the array 700, like in the display apparatus 800, 900, and 1000, is greater than about 3 microns and less than about 12 microns. In some other implementations, the total distance is between about 5 and about 9 microns. In some other implementations, the total distance is about 7 microns.

Like the control matrices 815 and 915 incorporated into the display apparatus 800 and 900, the control matrix 1101 includes first and second dielectric layers 812 and 814 deposited on top of the light blocking layer 707 and the write-enabling interconnects 720 (not shown), respectively. Since the control matrix 1101 omits the thicker layer of electrically insulating material 818, the control matrix 1101 includes a third layer of dielectric material 1110, having a standard IMD layer thickness, such as between about 0.1 microns and about 1 micron deposited over the shutter-open and shutter-close interconnects 722 and 724. The dielectric layers 812, 814 and 1110 are formed using transparent IMD materials. Thus, the IMD materials forming the first, second and third dielectric layers 812, 814 and 816 are preserved over the apertures 714 defined in the light blocking layer 707, avoiding extra patterning steps and reducing the cost of manufacture of the display apparatus 1100. In addition, at least the first dielectric layer 812 is deposited using a spin-on process, instead of more costly CVD or PECVD processes. In some other implementations, the layers of dielectric material are formed using conformal deposition processes and/or using light absorbing IMD materials.

Figure 12:
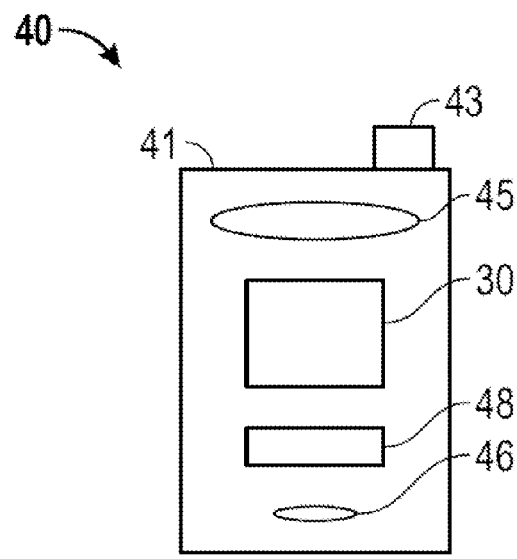
FIGS. 12 and 13 are example system block diagrams illustrating a display device that includes a plurality of display elements.
Figure 13:
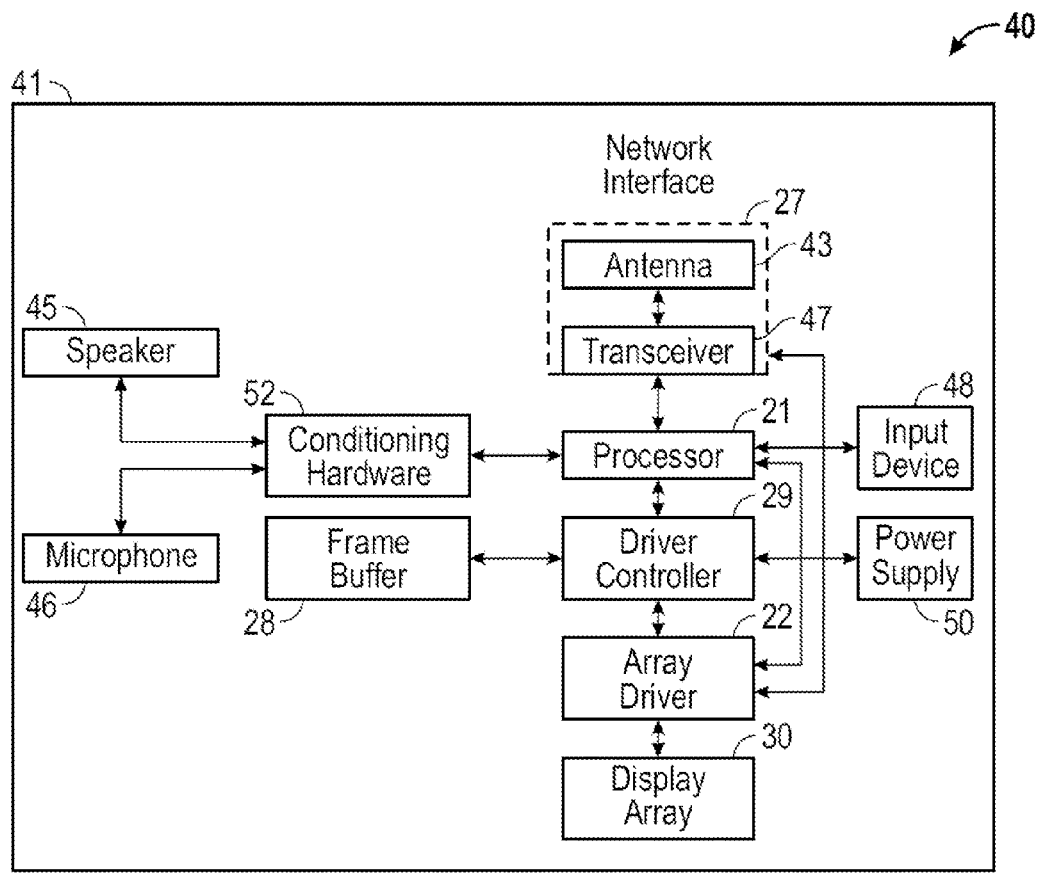

FIGS. 12 and 13 are example system block diagrams illustrating a display device 40 that includes a plurality of display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, electroluminescent (EL) displays, OLED, super twisted nematic (STN) display, LCD, or thin-film transistor (TFT) LCD, or a non-flat-panel display, such as a cathode ray tube (CRT) or other tube device. In addition, the display 30 can include a mechanical light modulator-based display, as described herein.

The components of the display device 40 are schematically illustrated in FIG. 12. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 12, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements. In some implementations, the array driver 22 and the display array 30 are a part of a display module. In some implementations, the driver controller 29, the array driver 22, and the display array 30 are a part of the display module.

In some implementations, the driver controller 29, the array driver 22, and the display array 30 are appropriate for any of the types of displays described herein. For example, the driver controller 29 can be a conventional display controller or a bi-stable display controller (such as a mechanical light modulator display element controller). Additionally, the array driver 22 can be a conventional driver or a bi-stable display driver (such as a mechanical light modulator display element controller). Moreover, the display array 30 can be a conventional display array or a bi-stable display array (such as a display including an array of mechanical light modulator display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:
    an array of display elements between a first substrate and a second substrate, each display element having suspended components including a movable light blocking component and a conductive beam coupled to the movable light blocking component;
    a control matrix including a plurality of interconnects, including at least one switched interconnect which couples to portions of a plurality of the display elements in the array, passes under at least one of the conductive beam and the movable light blocking components, and which is electrically isolated from the movable light blocking components;
    an electrical insulation layer having a thickness greater than about 1 micron and less than about 5 microns, disposed between an uppermost interconnect of the control matrix and the suspended components of the display elements; and
    a fluid filling a space between the first substrate and the second substrate.

2. The apparatus of claim 1, wherein the conductive beam of each of the display elements is coupled to an anchor, and the electric insulation layer is disposed under the anchors supporting the conductive beams of the display elements.

3. The apparatus of claim 1, wherein the electric insulation layer has a thickness of greater than about 1.5 microns and less than about 4 microns.

4. The apparatus of claim 1, wherein the electrical insulation layer has a thickness of greater than about 2 microns and less than about 4 microns.

5. The apparatus of claim 1, further comprising a light blocking layer positioned between the light-blocking component and a backlight, wherein the switched interconnect is disposed over the light blocking layer.

6. The apparatus of claim 5, wherein the light blocking layer includes a plurality of openings, and the light blocking component of each display element is configured to move into and out of alignment with a corresponding opening in the light blocking layer.

7. The apparatus of claim 6, wherein the electric insulation layer extends over the plurality of openings.

8. The apparatus of claim 1, wherein the switched interconnect includes one of a data interconnect, a write-enabling interconnect, and an actuation voltage interconnect.

9. The apparatus of claim 1, wherein the switched interconnect includes an interconnect coupled to display elements in multiple rows and multiple columns of the array of display elements.

10. The apparatus of claim 1, wherein the electric insulation layer is light absorbing.

11. The apparatus of claim 1, wherein the electric insulation layer is substantially transparent.

12. The apparatus of claim 1, comprising:
a display;
a processor that is configured to communicate with the display, the processor being configured to process image data; and
a memory device that is configured to communicate with the processor.

13. The apparatus of claim 12, the display further including:
a driver circuit configured to send at least one signal to the display; and
a controller configured to send at least a portion of the image data to the driver circuit.

14. The apparatus of claim 12, the display further including:
an image source module configured to send the image data to the processor, wherein the image source module comprises at least one of a receiver, transceiver, and transmitter.

15. The apparatus of claim 12, the display further including:
an input device configured to receive input data and to communicate the input data to the processor.

16. The apparatus of claim 1, wherein the uppermost interconnect of the control matrix couples to at least two of the display elements.

17. A display device, comprising:
an array of display elements between a first substrate and a second substrate, each display element including a light modulating means;
a control matrix including a plurality of interconnects, including at least one switched interconnect which couples to portions of a plurality of the display elements in the array, passes under at least a portion of the light modulating means, and which is electrically isolated from the light modulating means;
a means for reducing the strength of an electric field emanating from the switched interconnect on the light modulating means; and
a fluid filling a space between the first substrate and the second substrate, wherein the means for reducing the strength of the electric field is disposed between an uppermost interconnect of the control matrix and the light modulating means of the display device.

18. The display device of claim 17, wherein the light modulating means includes a light blocking shutter suspended over one of the first substrate and the second substrate by a compliant beam.

19. The display device of claim 17, wherein the means for reducing the strength of the electric field includes an electric insulation layer disposed between the switched interconnect and the light modulating means.

20. The display device of claim 17, wherein the electric insulation layer has a thickness greater than about 1 micron and less than about 5 microns.

21. The display device of claim 17, including means for reducing the capacitance of the interconnects in the control matrix.

22. The display device of claim 21, wherein the means for reducing the capacitance of the interconnects includes the means for reducing the strength of the electric field.

23. The display device of claim 17, wherein the uppermost interconnect of the control matrix couples to at least two of the display elements.

* * * * *